US006185697B1

(12) United States Patent
Shiraishi

(10) Patent No.: US 6,185,697 B1
(45) Date of Patent: Feb. 6, 2001

(54) DISK-ARRAY CONTROLLER

(75) Inventor: Kazuya Shiraishi, Ehime (JP)

(73) Assignee: NEC Corporation, Tokyo (JP)

( * ) Notice: Under 35 U.S.C. 154(b), the term of this patent shall be extended for 0 days.

(21) Appl. No.: 09/090,253

(22) Filed: Jun. 4, 1998

(30) Foreign Application Priority Data

Jun. 10, 1997 (JP) .................................................. 9-152472

(51) Int. Cl.$^7$ .............................. G06F 13/14; G06F 3/00
(52) U.S. Cl. .................................. 714/6; 711/114; 710/21
(58) Field of Search .................................. 714/5, 6, 7, 8; 710/20, 21, 107, 113; 711/112, 114

(56) References Cited

U.S. PATENT DOCUMENTS

| 5,694,581 | * | 12/1997 | Cheng ....................................... 710/7 |
| 5,745,789 | * | 4/1998 | Kakuta .................................... 710/21 |
| 5,893,138 | * | 4/1999 | Judd et al. ........................... 711/114 |
| 5,974,502 | * | 10/1999 | DeKoning et al. .................. 711/114 |
| 6,073,218 | * | 6/2000 | DeKoning et al. .................. 711/150 |

OTHER PUBLICATIONS

D. Patterson, et al., "A Case for Redundant Arrays of Inexpensive Disks (RAID)", Computer Science Division, Dec. 1987.
D. Patterson, et al., "A Case for Redundant Arrays if Inexpensive Disks (RAID)", Computer Science Division, 1988.

* cited by examiner

Primary Examiner—Robert W. Beausoliel, Jr.
Assistant Examiner—Christopher Revak
(74) Attorney, Agent, or Firm—McGuireWoods LLP

(57) ABSTRACT

A disk-array controller of the present invention has data-buffers 70–75 accessible from a host device and disk units, various selectors 42–69, XOR circuits 78–79, parity check circuits 76–77. By changing the settings of these components, transmission passes are changed. The settings can be programmed more than one by set registers 340–394 and execution counters 34–39. Using time-sharing buses such as PCI buses 15, 18, each program performs parallel processing because plural programs time-share the transmission bus during the period of acquiring access permission to the bus.

9 Claims, 20 Drawing Sheets

FIG.15

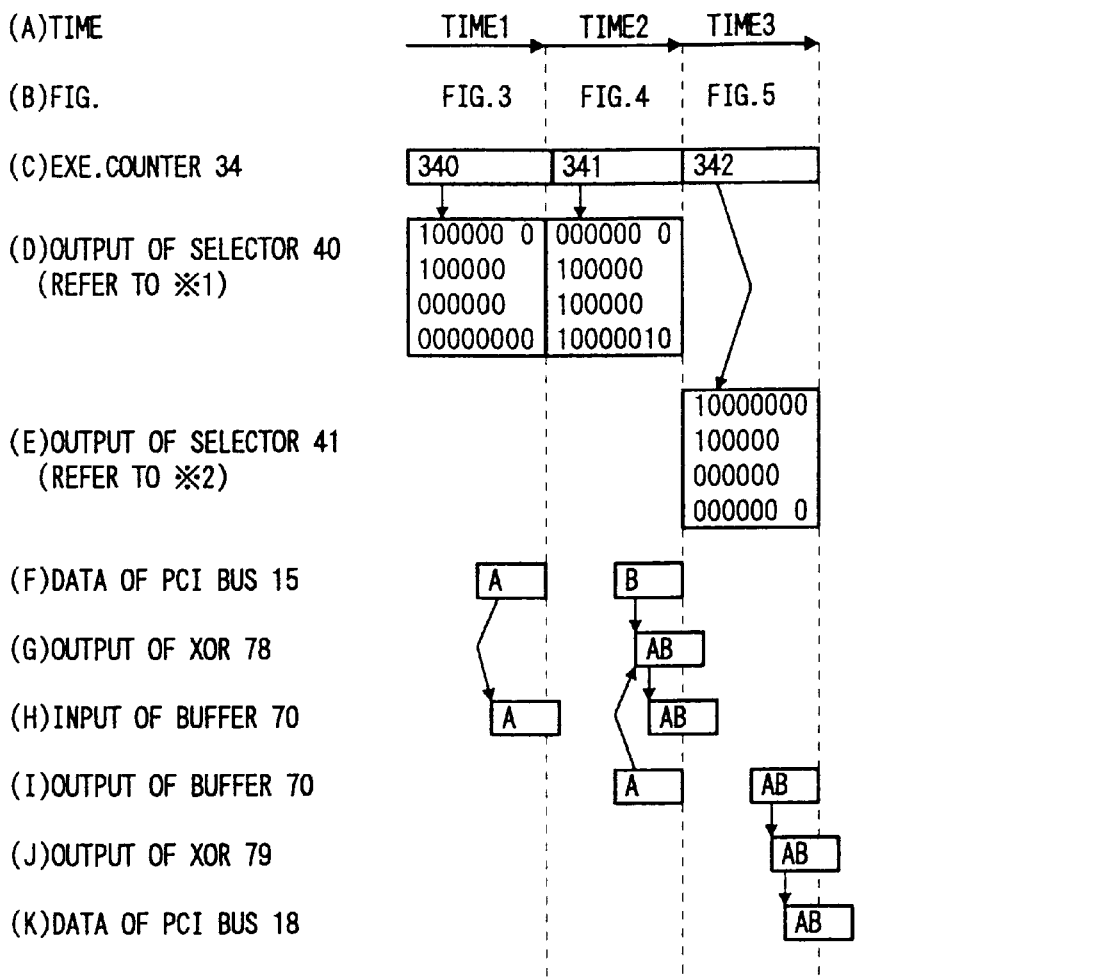

※1:OUTPUT CONTENTS OF SELECTOR 40
| 100000 0 | ← SELECT SIGNALS OF SELECTOR 42~47,EXE.SIGNAL OF PARITY CHECK 76 |
| 100000 | ← WRITE SIGNALS OF DATA BUFFER 70~75 |
| 000000 | ← READ SIGNALS OF DATA BUFFER 70~75 |
| 00000000 | ← SELECT SIGNALS OF SELECTOR 48~55 |

※2:OUTPUT CONTENTS OF SELECTOR 41
| 10000000 | ← SELECT SIGNALS OF SELECTOR 56~63 |
| 100000 | ← READ SIGNALS OF DATA BUFFER 70~75 |
| 000000 | ← WRITE SIGNALS OF DATA BUFFER 70~75 |
| 000000 0 | ← SELECT SIGNALS OF SELECTOR 64~69,EXE.SIGNAL OF PARITY CHECK 77 |

AB=A.xor.B

DISK-ARRAY CONTROLLER

BACKGROUND OF THE INVENTION

The present invention relates to a disk-array controller for a mass magnetic disk storage, a mass optical disk storage, or the like, and especially to a disk-array controller having an array input/output control unit for a plurality of disk units of a computer system.

Heretofore, a disk-array controller of this nature has been used for improving the system performance and the cost performance. Here, a plurality of inexpensive small disk units are substituted for a single expensive large disk unit and a set of the small disk units can be appeared as an expensive large high-speed disk unit.

There are several methods for designing a disk array, for example, David A. Patterson, Garth Gibson and Randy H. Katz, "A case for Redundant Arrays of Inexpensive Disks", California University report No. UCB/CSD 87/391 (December, 1987).

In this article, methods of constructing disks including redundancies are classified into five groups as different levels of RAID (Redundant Arrays of Inexpensive Disks) systems. As an example of such levels, an array of five disk units is described in the above article.

A first-level RAID (RAID 1) system uses disk units (N in total) for storing data and mirror disk units (N in total) for mirroring the data. The RAID 1 system stores duplicated copies of information obtained by writing the information duplicatively on data disk units.

A second-level RAID (RAID 2) system provides a configuration of redundant disk using Hamming code which is one of ECCs (error-correcting codes), for example including four data disk units and three ECC disk units. However, the RAID 2 system has been hardly implemented because of its high level of redundancy.

A third-level RAID (RAID 3) system comprises a group (rank) of disk units (N+1 in total). In this case, each of data blocks is divided into N chunks. Then, the divided chunks are distributed across different data disk units (N in total) and stored therein. For reading the data without any loss when one of the disk units is troubled, parity information that corresponds to each of the divided chunks is also stored in a dedicated parity disk unit.

A fourth-level RAID (RAID 4) system also comprises a group of disk units (N+1 in total) but it is different from the RAID 3 system in that the RAID 4 system stores data in data disk units in a manner that the data to be stored in the corresponding data disk unit are divided into any data blocks and then the blocks are stored in the corresponding data unit without spreading across several disks. Thus, only one disk unit is used at the time of reading the data, so that a total throughput is increased by having independently accesses to the disk units if a data-transfer rate is short. The RAID 4 system further comprises a parity disk unit as in the case with the RAID 3 system. At the time of writing, however, four steps are required for updating parity information. Thus, the parity disk unit can be accessed whenever any of the data disk units are updated, so that it tends to become a bottleneck in writing. Accordingly, there have been a small number of reported cases of using the RAID 4 system.

A fifth-level RAID (RAID 5) system has almost the same configuration as that of the RAID 4 system, except the difference in handling the parity information. In the RAID 5 system, parity information is not concentrated in one disk unit but distributed across the disk units (N+1 in total) to correspond with the distribution of data. In the above article, an example of the RAID 5 system is disclosed but there is a disadvantage in which a parity update requires four steps. In the example, a write operation is performed on a non-volatile memory unit to indicate the completion of write operation to the host and then the parity is substantially updated at a later spare time.

Regarding the above RAID 1–5 systems, for example, Japanese Patent Application Laid-Open No. 6-180623 (1994) discloses a multiplex data bus architecture for a disk-array controller. FIG. 20 is a block diagram that shows an example of the conventional disk-array controller. The disk-array controller comprises a data bus architecture which can be adjusted to execute a data-transfer operation between a host device and a plurality of disk units. The disk units are arranged as a disk array with RAID 1, 3, 4, or 5.

By way of multiplexers 135–140, an exclusive-OR gate circuit 134 (hereinafter, also referred as an XOR circuit), which is provided as a circuit for generating parity, can receive:

data from the host device through double registers 110–114 and a host SCSI adapter 143 which is provided as a DMA interface for communicating between a host device system data pass 144 connecting to the host device and SCSI data passes 141, 142;

data from the disk units through SCSI bus interface chips 128–132 connecting their respective disk units; and data from a static RAM (SRAM) 133.

Furthermore, outputs from the XOR circuit 134 can be transferred to: the host device through double registers 110–114 and the host SCSI adapter 143; the disk units through three-state buffers 115–119 and SCSI bus interface chips 128–132; and the SRAM 133 through a three-state buffer 120. Therefore, a series of data passes from the host device to the disk units can be provided by setting whether each of those passes is to be used or not, independently.

A writing operation with the RAID 5 system will be described as an example of using the disk-array controller shown in FIG. 20. In the writing operation with the RAID 5 system, both of read and write procedures are involved. More concretely, old data and old parity are read out, while new data and new parity are written. The operation will be described on the assumption that the data is written to the disk unit of channel 2 while the parity information is updated on the disk unit of channel 1. Initially, information is read out from each of the disk units of channels 1 and 2 and then provided to the XOR circuit 134 (i.e., parity-generating circuit) through the multiplexers 135, 136. An output from the XOR circuit 134 is stored in the external SRAM 133 through a bus 126, an available three-state buffer 120, and a bus 127. Subsequently, the double register 110 receives new data from the host device and then the new data is written on the disk unit of channel 2 through a bus 122 and the SCSI bus interface. The new data is also provided to the XOR circuit 134. The information written in the SRAM 133 is also provided to the XOR circuit 134 through the multiplexer 140. An output of XOR circuit (i.e., the parity-generating circuit) 134 is new parity. The parity can be provided to the disk units through the available three-state buffer 115, a bus 121, and the available SCSI bus interface chip 128.

However, the process described above has the following problems. The first problem is that multiple different transmissions cannot be carried out in parallel. The data transmission to the host device is carried out without any break, so that the settings of each of the double registers, the three-state buffers, the multiplexers, and so on should be in a fixed state during the data transmission. If each of the settings is changed in the course of the data transmission, the data does not flow correctly. Notably, only one XOR circuit (i.e., one parity-generating circuit) is equipped in the system. If data transmissions using the XOR circuit are concurrently started, each of the data transmissions may be occurred in succession.

In addition, the second problem is that an XOR calculation cannot be performed on data in one operation if the number of data exceeds the number of inputs of the XOR circuit (the parity-generating circuit). The XOR operation is a necessity for data restoration or the like in a case where the group includes many disk units, so that if the XOR calculations are divided and executed in sequence it takes much time to complete the XOR operation due to the following facts:

- the number of the XOR circuit (the parity-generating circuit) is one;
- the number of inputs to the XOR circuit is the sum of the number of the SCSI buses on the side of the disk units and the number of the SRAM; and
- an inability to generate feedback from an output of the XOR circuit to an input of the XOR circuit. This inability is occurred because the settings described above cannot changed during the transmission as pointed out as the first problem, and if the out of the XOR circuit is adjusted to generate feedback on the input of the XOR circuit the feedback continues without termination.

SUMMARY OF THE INVENTION

Therefore, an object of the present invention is to provide a disk-array controller for interconnecting between a host device and an array of disk units.

Another object of the present invention is to provide a disk-array controller that supports different RAID settings with various procedures of data transmissions.

A further object of the present invention is to provide a disk-array controller which is able to perform multiple transmissions in parallel without waiting for taking their turns in the XOR circuit (the parity-generating circuit).

Yet another object of the present invention is to provide a disk-array controller that performs an XOR calculation on data in one operation in spite that the number of data exceeds that of inputs of the XOR circuit (the parity-generating circuit).

According to an embodiment of the present invention, there is provided a disk-array controller, comprising:
  data buffers accessible from any of a host device and disk units;
  exclusive-OR circuits for carrying out exclusive-OR operations;
  circuits for checking redundant parity, where outputs of the exclusive-OR circuits are determined as true when the outputs are all zero "0";
  selectors for selecting outputs from the host devices or the disk units and outputs from the exclusive-OR circuits and transferring selected outputs to the data buffers;
  selectors for selecting whether or not to transport outputs from each of the data buffers to the exclusive-OR circuits;
  selectors for selecting whether or not to transport outputs from the host device or the disk units;
  selectors for selecting whether or not to transport all one "1" to the exclusive-OR circuits to reverse outputs of the XOR circuit; and
  transfer buses for transferring outputs of the exclusive-OR circuits to the host device and the disk units,
wherein
  the transfer buses are determined by adjusting a selection of the selectors at the time of transmission.

The disk-array controller further comprising:
  a plurality of set registers for retaining read/write execution signals of each of the data buffers, select signals of each of the selectors, and a setting whether or not to check the redundant parity every time transmission occurs; and
  execution counters for retaining an execution position of such a setting, wherein
  settings of the transfer buses are preliminary programmed,
  local buses that perform time sharing processing are used as PCI buses, and
  the transfer buses are adjusted in accordance with the program during a period of acquiring access of the local busses.

According to another aspect of the present invention, there is provided a disk-array controller having a host device and a plurality of disk units, comprising:
  a first bus connecting to the host device;
  a second bus connecting to a plurality of the disk units;
  a plurality of data buffers connecting between the first bus and the second bus through input selectors and output selectors;
  a first exclusive-OR circuit in which output of the output selector, output of the first bus, output of a selector which outputs odd or even are provided as inputs;
  a second exclusive-OR circuit in which output of the output selector, output of the second bus, output of a selector which outputs odd or even are provided as inputs; and
  a control unit for controlling the selections of the input selectors and the output selectors, wherein
  outputs of the first exclusive-OR circuit and the second exclusive-OR circuit are stored in any of a plurality of the data buffers.

In the disk-array controller, the following modifications may be made:
  the control unit controls the selections of the input selectors and the output selectors with reference to a RAID level and the first bus, the second bus are PCI buses, and a SCSI interface chip is provided between the host device and the first bus, and also SCSI interface chips are provided between a plurality of the disk units and the second bus;
  the input selectors connecting to the first bus and output of the first exclusive-OR circuit produce outputs of data to any of the data buffers under the control of the control unit, outputs of the data buffers enter into the first exclusive-OR circuit through the output selectors under the control of the control unit;
  the input selectors connecting to the second bus and output of the second exclusive-OR circuit produce outputs of data to any of the data buffers under the control of the control unit, outputs of the data buffers enter into the second exclusive-OR circuit through the output selectors under the control of the control unit;
  the input selectors connecting to the first bus and output of the first exclusive-OR circuit produce outputs of data to any of the data buffers under the control of the control unit, outputs of the data buffers enter into the second exclusive-OR circuit through the output selectors under the control of the control unit to supply it to the second bus for storing it into one of the plurality of disk units; and the input selectors connecting to the second bus and output of the second exclusive-OR circuit produce outputs of data to any of the data buffers under the control of the control unit, outputs of the data buffers enter into the first exclusive-OR circuit through the output selectors under the control of the control unit to input it to the host devices.

Other objects and features will be clarified from the following description with reference to attached drawings.

BRIEF DESCRIPTION OF THE DRAWINGS

FIGS. 15–17 are timing charts for explaining the invention;

PREFERRED EMBODIMENTS OF THE INVENTION

Preferred embodiments of the present invention will now be described will now be described with reference to the drawings.

Figure 2:
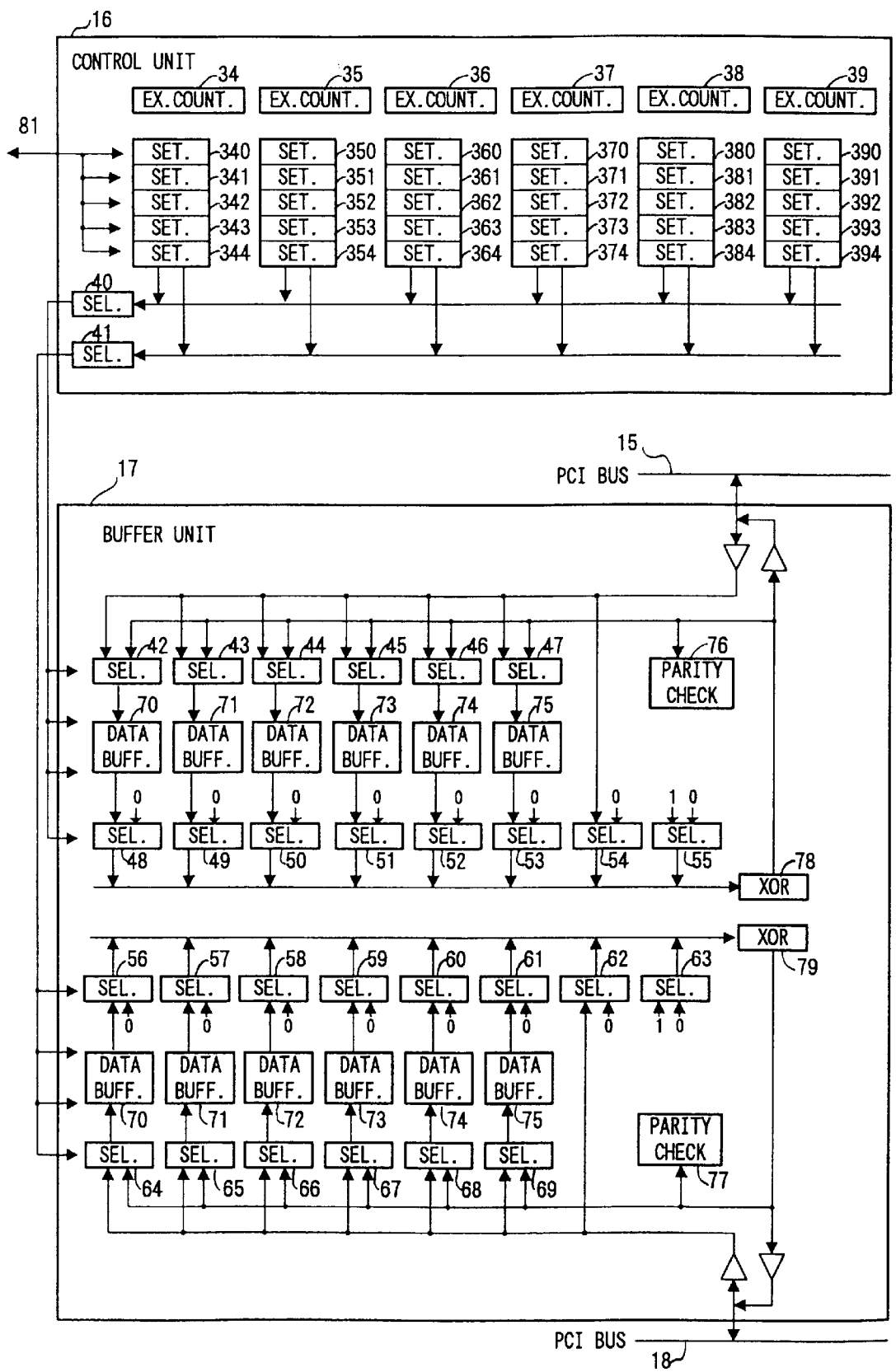
FIG. 2 is a detailed block diagram of a control unit 16 and a buffer unit 17.

As shown in the FIG. 2, a disk-array controller of the present invention comprises: a PCI (peripheral component interconnect) bus 15 on the side of a host device; a PCI bus 18 on the side of disk units; data buffers 70–75 positioned between the PCI buses 15 and 18 so that the host device and the disk units are able to access the data buffers 70–75; selectors 42–55 for interconnecting between the PCI bus 15 and each of the data buffers 70–75; selectors 56–69 for interconnecting between the PCI bus 18 and each of the data buffers 70–75; an exclusive OR circuits (an XOR circuits) 78–79 for performing XOR calculations (i.e., XOR operations); a check circuits 76–77 for checking redundant parity; registers 340–394 for the settings of each transmission; and execution counters 34–39 for retaining positions for executing the settings therein.

The selectors 42–55 and 56–69 are on the opposite sides (i.e., the host device's side and the disk array's side), respectively, but they have the same construction. Each of them comprises: selectors 42–47, 64–69 for selecting data of the PCI buses and output data of the XOR circuits and transferring the selected data to data buffers; selectors 48–53, 56–61 for selecting whether or not to transfer output data of each data buffers to the XOR circuits; selectors 54, 62 for selecting whether or not to transfer data of the PCI buses to the XOR circuits; and selectors 55, 63 for selecting whether or not to transfer all one "1" to the XOR circuits to reverse the output data of the XOR circuits. A check circuit for redundant parity reaches a conclusion that the data transmission is in a normal state if the output of the XOR circuit is all zero "0". The register for each of the transmission stores a read/write execution signal of each data buffer, a select signal of each selector, and a decision of whether or not to check the redundant parity.

The present invention is to provide a data transmission architecture having data buffers which are accessible from a host device and disk units to interconnect the host device and an array of the disk units.

The data transmission architecture comprises various selectors, XOR circuits, and parity check circuits. Transmission passes are changed depending on the changes in the settings of those components which can be programmed by the set registers and the execution counters. Therefore, the data transmission architecture is compatible with the settings of different RAID levels in which various transmission procedures are established.

A PCI bus is provided as a single bus that connects to a plurality of the devices which carry out their data transmissions by the way of time-sharing the use of the bus by alternating use of it as they acquire access permission to the bus. In this case, therefore, the PCI bus can be characterized in that any device occupies the bus moment to moment but it seems like a real-time parallel processing as a whole. Using this characteristics, the program provided by the set register and the execution register sets various selectors, XOR circuits, and parity check circuits for the sake of its transmission only at the time of acquiring the permission of using the PCI bus by that program. However, the settings are reset to their initial states when the allowance of using the PCI bus is canceled. Consequently, any program occupies the PCI bus, various selectors, XOR circuits, and parity check circuits, moment to moment, but it seems like a real-time parallel processing as a whole, so that wait for the sequence in the XOR circuit cannot be occurred.

An output of each data buffer can be entered into any of data buffers through the XOR circuit in conjunction with the data of PCI bus, and also the output can be reused over and over again by increasing the number of the set registers. Consequently, the XOR calculation can be performed independent of the number of inputs of the XOR circuit.

Figure 1:
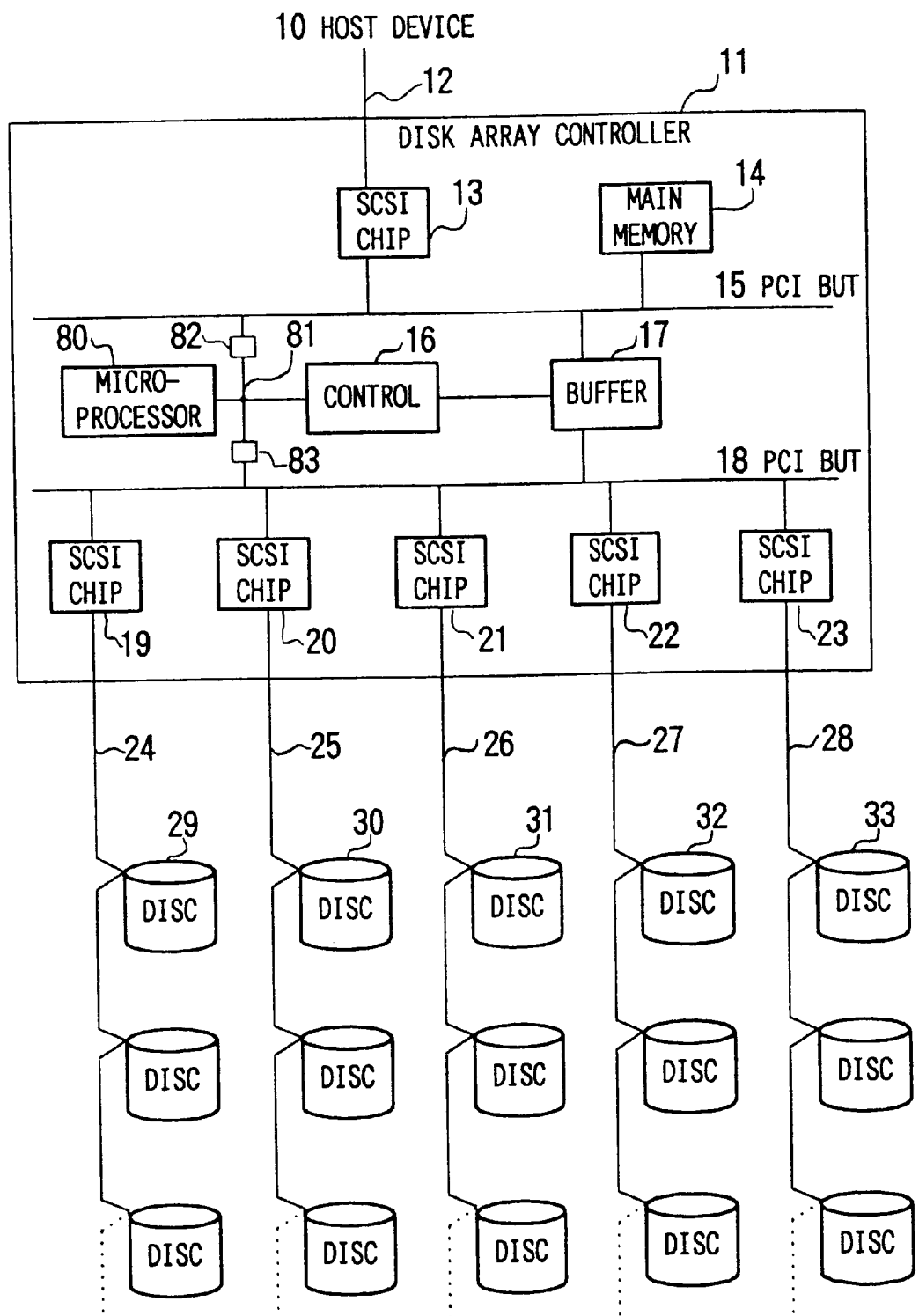
FIG. 1 is a block diagram of an embodiment according to the present invention.

Referring now to FIG. 1 is a block diagram shown in an embodiment of the present invention. A disk-array controller 11 connects to a host device 10 through a SCSI (Small Computer System Interface) bus 12 and also to disk units 29–33 through their respective SCSI buses 24–28. The disk-array controller 11 comprises two PCI (Peripheral Component Interconnect) buses 15 and 18, which are one of input/output buses for a personal computer or a work station. As shown in the figure, the PCI bus 15 is on the side of host device while the PCI bus 18 is on the side of disk units. These PCI buses 15, 18 are standardized local buses. Each of the PCI buses 15, 18 is provided as a single bus that connects to a plurality of the devices which carry out their data transmissions by the way of time-sharing the use of the bus by alternating use of it as they acquire access permission to the bus. In this case, therefore, the PCI bus can be characterized in that any device occupies the bus moment to moment but it seems like a real-time parallel processing as a whole. A host SCSI bus 12 and the PCI bus 15 are connected together through a SCSI bus interface chip 13. On the other hand, disk SCSI buses 24–28 and the PCI bus 18 are connected together through SCSI bus interface chips 19–23. These SCSI bus interface chips 13, 19–23 are commercially available products (e.g., 53C825 chip manufactured by SYMBIOS, Co., Ltd.). A connection between the PCI bus 15 and the PCI bus 18 is attained through a buffer unit 17. In this case, a control unit 16 controls the data transmission between these PCI buses 15, 18. Furthermore, a main memory 14 for temporary storing data is connected to the PCI bus 15.

All of the SCSI bus interface chips 13, 19–23 and the control unit 16 are operated under the control of a microprocessor 80. That is, the SCSI bus interface chip 13 is placed under the control of the microprocessor 80 through a bus converting adapter 82 which interconnects between a processor bus 81 connecting to the microprocessor 80 and the PCI bus 15. But, the SCSI bus interface chips 19–23 are placed under the control of the microprocessor 80 through a bus converting adapter 83 which interconnects between the processor bus 81 and the PCI bus 18.

FIG. 2 is a block diagram that illustrates the control unit 16 and the buffer unit 17 which are connected between the PCI bus 15 and the PCI bus 18. The control unit 16 comprises execution counters 34–39 and set registers 340–394, while the buffer unit 17 comprises data buffers 70–75, selectors 42–69, XOR circuits 78–79, and parity check circuits 76–77.

The execution counter 34 and the set registers 340–344 make up one transmission program. The execution counter 34 memorizes the numbers of the set resisters 340–344. Each of the set resisters 340–344 memorizes: which one is selected from the PCI bus 15 and the PCI bus 18; read/write execution signals of the data buffers 70–75, select signals of the selectors 42–55; a parity check signal of the parity check circuit 76 when the PCI bus 15 is selected to be used; read/write execution signals of the data buffers 70–75; select signals of the selectors 56–69; and a parity check signal of the parity check circuit 77 when the PCI bus 18 is selected to be used. Prior to activate the data transmission, the microprocessor 80 writes information about the data transmission on the required number of the set registers in the order from the set register 340 to the one corresponding to the required number among all of the set registers 340–344 by way of the processor bus 81. Initially, the set register 340 is stored in the execution counter 34. If a data transmission is allowable by the results of comparing a read/write signal of the corresponding set register 340 with free capacities of the data buffers 70–75, the data transmission is performed once by outputting the content of the set register 340 to the selectors 40–41 after acquiring the right to use the PCI bus 15 or the PCI bus 18. After the completion of the data transmission, a value "1" is added to the content of the execution counter 34. If the executed setting is of the last one, however, the execution counter stores the initial value 340. By repeating the procedure described above, the data transmissions are performed at times corresponding to the number of the desired data. That is, the execution counter has a function like a ring counter for specifying the settings in a round-robin fashion from the corresponding set registers 340–344. In an analogous fashion, five transmission programs can be constructed by the execution counters 35–39 and the set registers 350–394.

The selector 40 comprises first to sixth inputs connecting to their respective execution counters 34–39, outputs connecting to selectors 42–55 of their respective data buffers 70–75, the data buffers 70–75, and a parity check circuit 76, respectively, and outputs the settings of the execution counters 34–39 that acquire the permission of using the PCI bus 15.

Also, the selector 41 comprises first to sixth inputs connecting to their respective execution counters 34–39, outputs connecting to selectors 56–69 of their respective data buffers 70–75, the data buffers 70–75, and a parity check circuit 77, respectively, and outputs the settings of the execution counters 34–39 that acquire the permission of using the PCI bus 18.

In the buffer unit 17, as shown in FIG. 2, there are two sets of the data buffers 70–75 which are the same sets but arranged in different positions. The buffer unit 17 comprises the data buffers 70–75, a first input connecting to the selectors 42–47, a second input connecting to the selectors 64–69, a first output connecting to the selectors 48–53, a second output connecting to the selectors 56–61, an input for read/write execution signal from the selector 40, and an input for read/write execution signal from the selector 41. The data buffers 70–75 performs data input-output operations using the function of FIFO (first-in first-out) in response to the read/write execution signal.

Each of the selectors 42–47 comprises a first input connecting to the XOR circuit 78, a second input connecting to the PCI bus 15, an output connecting to the data buffer 70–75, and an input for select signal from the selector 40.

Also, each of the selectors 48–53 comprises a first input connecting to a logical 0 voltage source, a second input connecting to the data buffers 70–75, an output connecting to the XOR circuit 78, and an input for select signal from the selector 40. The connections are switched in response to the select signal. The selector 54 comprises a first input connecting to a logical 0 voltage source, a second input connecting to the PCI bus 15, an output connecting to the XOR circuit 78, and an input for select signal from the selector 40. The connections are switched in response to the select signal. The selector 55 comprises a first input connecting to a logical 0 voltage source, a second input connecting to a logical 1 voltage source, an output connecting to the XOR circuit 78, and an input for select signal from the selector 40. The connections are switched in response to the select signal.

On the other hand, each of the selectors 56–61 comprises a first input connecting to a logical 0 voltage source, a second input connecting to the data buffers 70–75, an output connecting to the XOR circuit 79, and an input for select signal from the selector 41. The connections are switched in response to the select signal. The selector 62 comprises a first input connecting to a logical 0 voltage source, a second input connecting to the PCI bus 18, an output connecting to the XOR circuit 79, an input for select signal from the selector 41. The connections are switched in response to the select signal. The selector 63 comprises a first input connecting to a logical 0 voltage source, a second input connecting to a logical 1 voltage source, an output connecting to the XOR circuit 79, an input for select signal from the selector 41. The connections are switched in response to the select signal.

Furthermore, each of the selectors 64–69 comprises a first input connecting to the XOR circuit 79, a second input connecting to the PCI bus 18, an output connecting to the data buffers 70–75, an input for select signal from the selector 41. The connections are switched in response to the select signal.

The XOR circuit 78 comprises first to eighth inputs connecting the selectors 48–55, an output connecting to the PCI bus 15, the selectors 42–47, or the parity check circuit 76. The XOR circuit 78 outputs XOR (exclusive disjunction) of the first to eighth inputs. Similarly, the XOR circuit 79 comprises first to eight inputs connecting to the selectors 56–63, an output connecting to the PCI bus 18, the selectors 64–69, or the parity check circuit 77. The XOR circuit 79 outputs XOR of the first to eighth inputs.

The parity check circuit 76 comprises an input connecting to the XOR circuit 78 and an input for parity check execution signal from the selector 40. The parity check circuit 76 detects a normal if the input data is all 0 or an error if it is not 0. Similarly, the parity check circuit 77 comprises an input connecting to the XOR circuit 79 and an input for parity check execution signal from the selector 41. The parity check circuit 77 detects a normal if the input data is all 0 or an error if it is not 0.

Next, operations of the embodiment of the present invention will be described in detail with reference to FIGS. 3 to 5 and FIG. 15. In the data transmission of the present embodiment, as an example of operations which is frequently used for data transmissions in the RAID 5 system, a write operation will be described in which XOR (exclusive disjunction) of two data stored in a main memory 14 shown in FIG. 1 is written on a disk unit. The present data transmission uses one program and one data buffer to write both of data A and data B stored in the main memory 14 on the disk unit 29.

Prior to activate the data transmission, a microprocessor 80 writes the following data on set resisters 340–342 of a control unit 16 through a processor bus 81.

Set resister 340
The use of PCI bus 15 on host device's side
Select signal of selector 42=1
Executing write operation of data buffer 70
Set resister 341
The use of PCI bus 15 on host device's side
Select signal of selectors 48, 54=1
Executing write operation of data buffer 70
Executing read operation of data buffer 70
Set resister 342
The use of PCI bus 18 on disk units' side
Select signal of selector 56=1
Executing read operation of data buffer 70

Secondly, we will describe with reference to a time chart of FIG. 15. In FIG. 15, reference numerals that indicate the flow of data, contents of the execution counter 34, the states of selectors, and so on are illustrated in conjunction with heavy lines in the other figures. At time 1, the setting 340 is executed to write data A, which is entered from the PCI bus 15 on the host device's side, on a data buffer 70 by way of a data flow indicated as a heavy line in FIG. 3.

Figure 4:
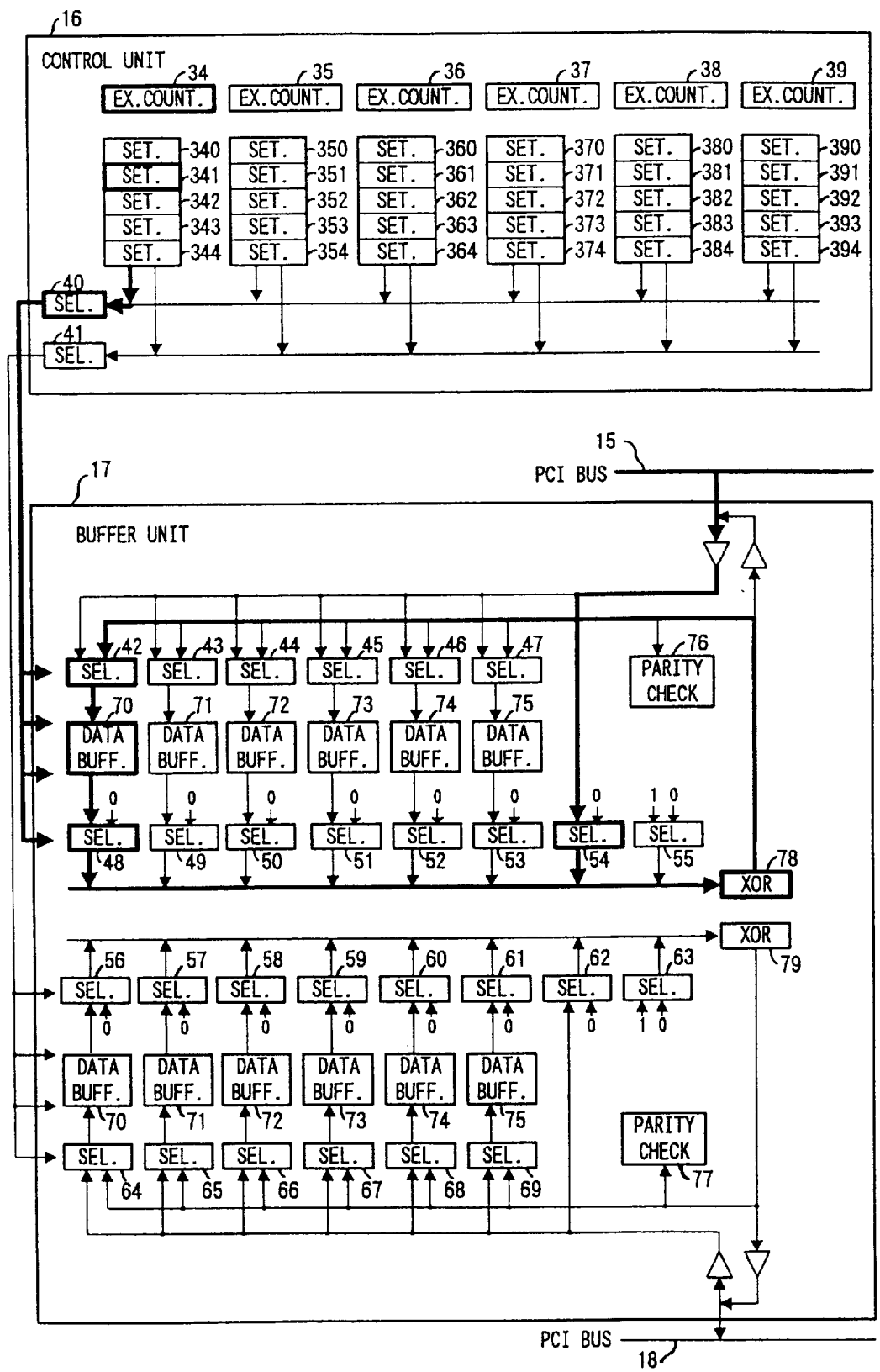
Figure 5:
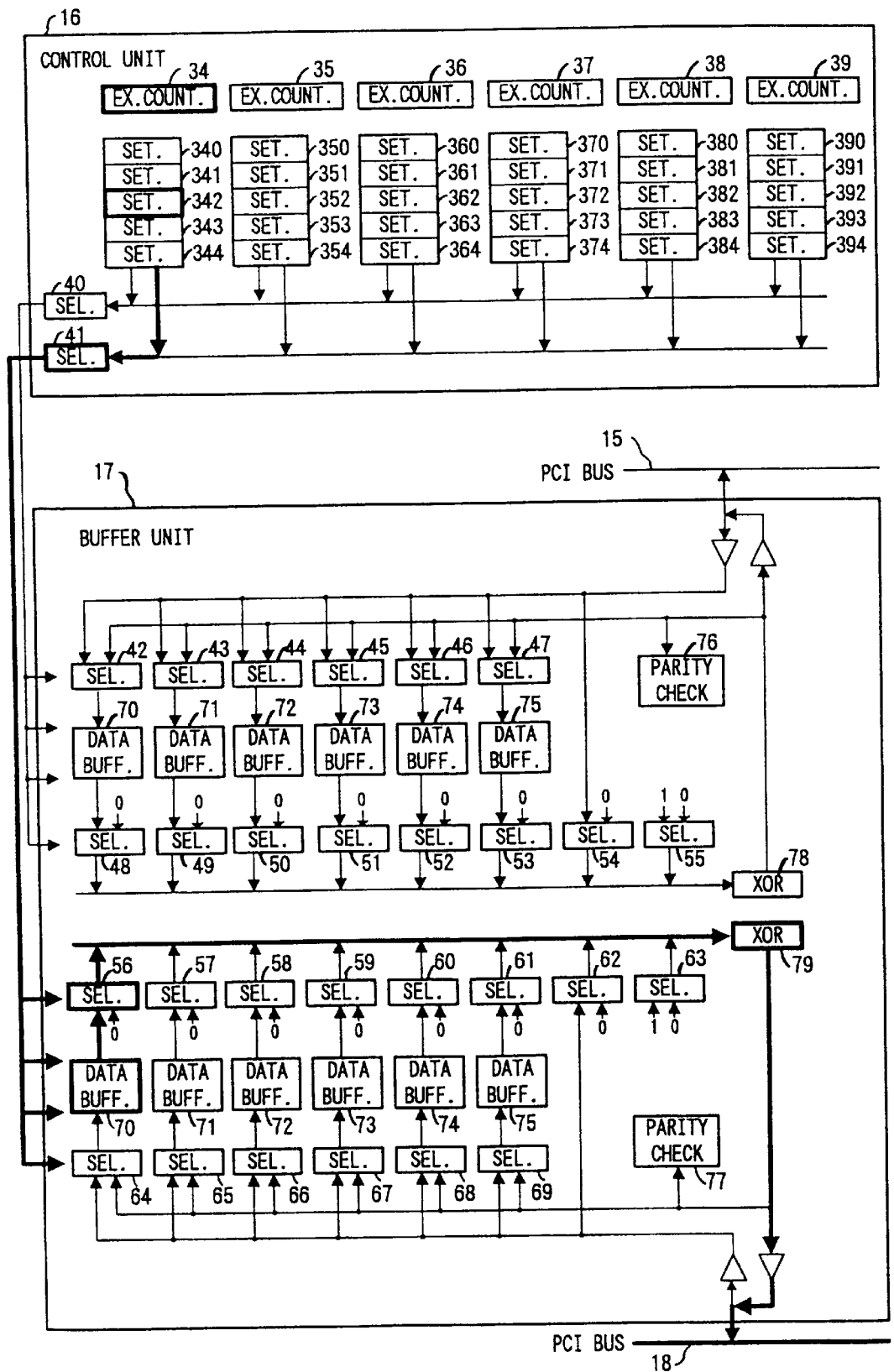

At time 2, the setting 341 is executed to write XOR obtained form the XOR circuit 78 using data B (which is entered from the PCI bus 15 on the host device's side) and data A (which is read out from the data buffer 70 concurrently with data B) on the data buffer 70 by way of a data flow indicated as a heavy line in FIG. 4. By the way, the XOR data of the data A and the data B is referred as data AB.

At time 3, the setting 342 is executed. Data AB read out from the data buffer 70 is outputted to the PCI bus 18 on the disk units' side and then written on a disk unit 29 through a SCSI chip 19, by way of a data flow indicated in FIG. 5.

By repeating the data transmissions of times 1 to 3, the transmissions corresponding to the number of desired data are performed. Furthermore, it is possible to repeat the XOR calculation over and over again by increasing the number of set registers to add the same transmission as that of the set the register 341.

In the next place, we will explain another operations of the embodiment of the present invention, especially an operation in which a plurality of transmissions is performed in parallel, with the reference to FIGS. 3 to 8 and FIG. 16.

In the present transmission, as descried bellow, the operation described above of writing the XOR of two data on the disk unit is executed in parallel with the same operation. In the present transmission, furthermore, two programs and two data buffers are used to write XOR of data A and data B stored in a main memory 14 on a disk unit 29 and write XOR of data C and data D stored in the main memory 14 on a disk unit 30.

Prior to activate the data transmission, the microprocessor 80 writes the following data on set registers 340–342, 350–352 of the control unit 16 by way of the processor bus 81.

Set resister 340
The use of PCI bus 15 on host device's side
Select signal of selector 42=1
Executing write operation of data buffer 70
Set resister 341
The use of PCI bus 15 on host device's side
Select signal of selectors 48, 54=1
Executing write operation of data buffer 70
Executing read operation of data buffer 70
Set resister 342
The use of PCI bus 18 on disk units' side
Select signal of selector 56=1
Executing read operation of data buffer 70
Set resister 350
The use of PCI bus 15 on host device's side
Select signal of selector 43=1
Executing write operation of data buffer 71
Set resister 351
The use of PCI bus 15 on host device's side
Select signal of selectors 49, 54=1
Executing write operation of data buffer 71
Executing read operation of data buffer 71
Set resister 352
The use of PCI bus 18 on disk units' side
Select signal of selector 57=1
Executing read operation of data buffer 71

Figure 3:
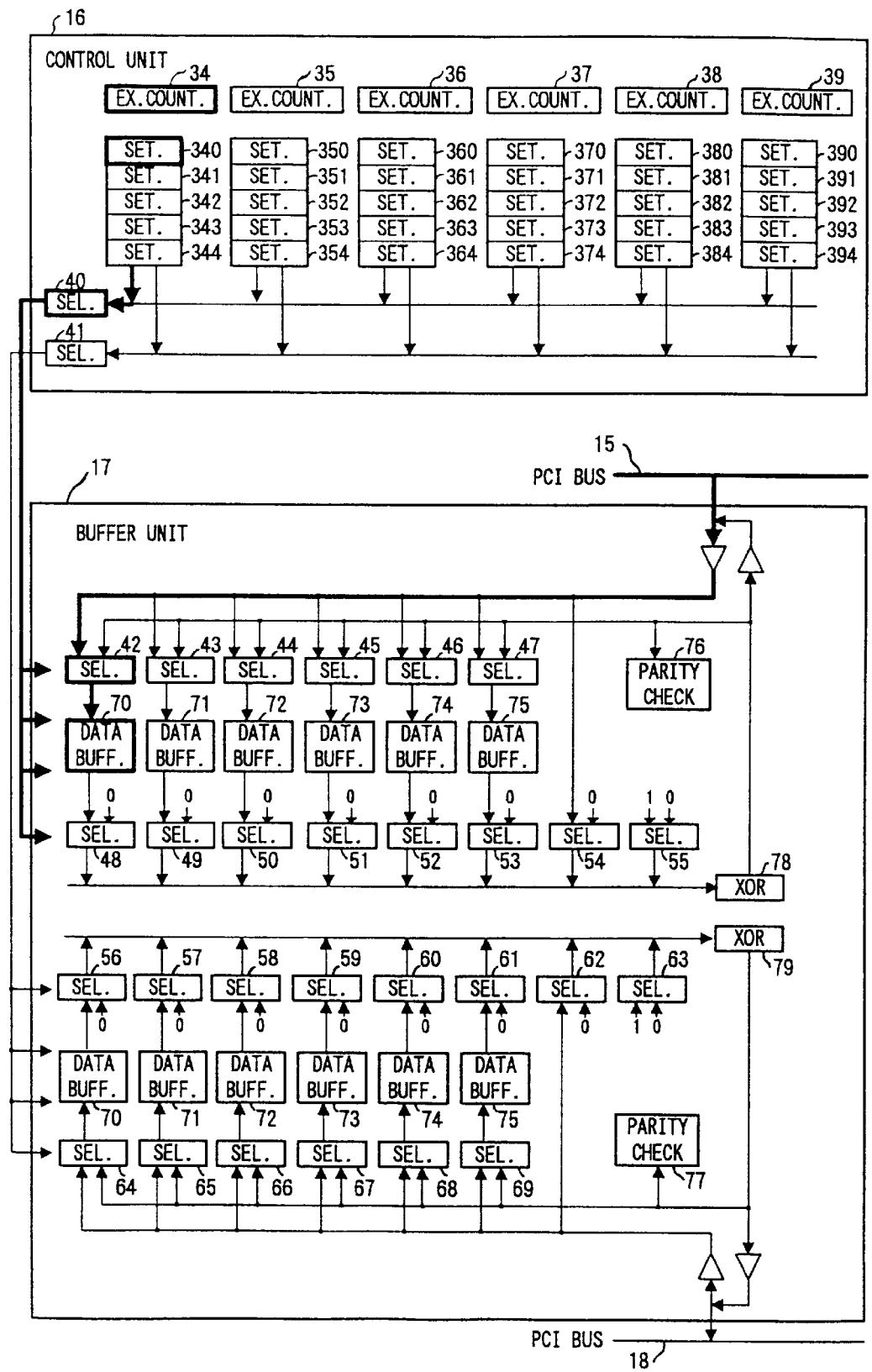
FIGS. 3–14 are diagrams of that shown in FIG. 2 for various settings.
Figure 16:
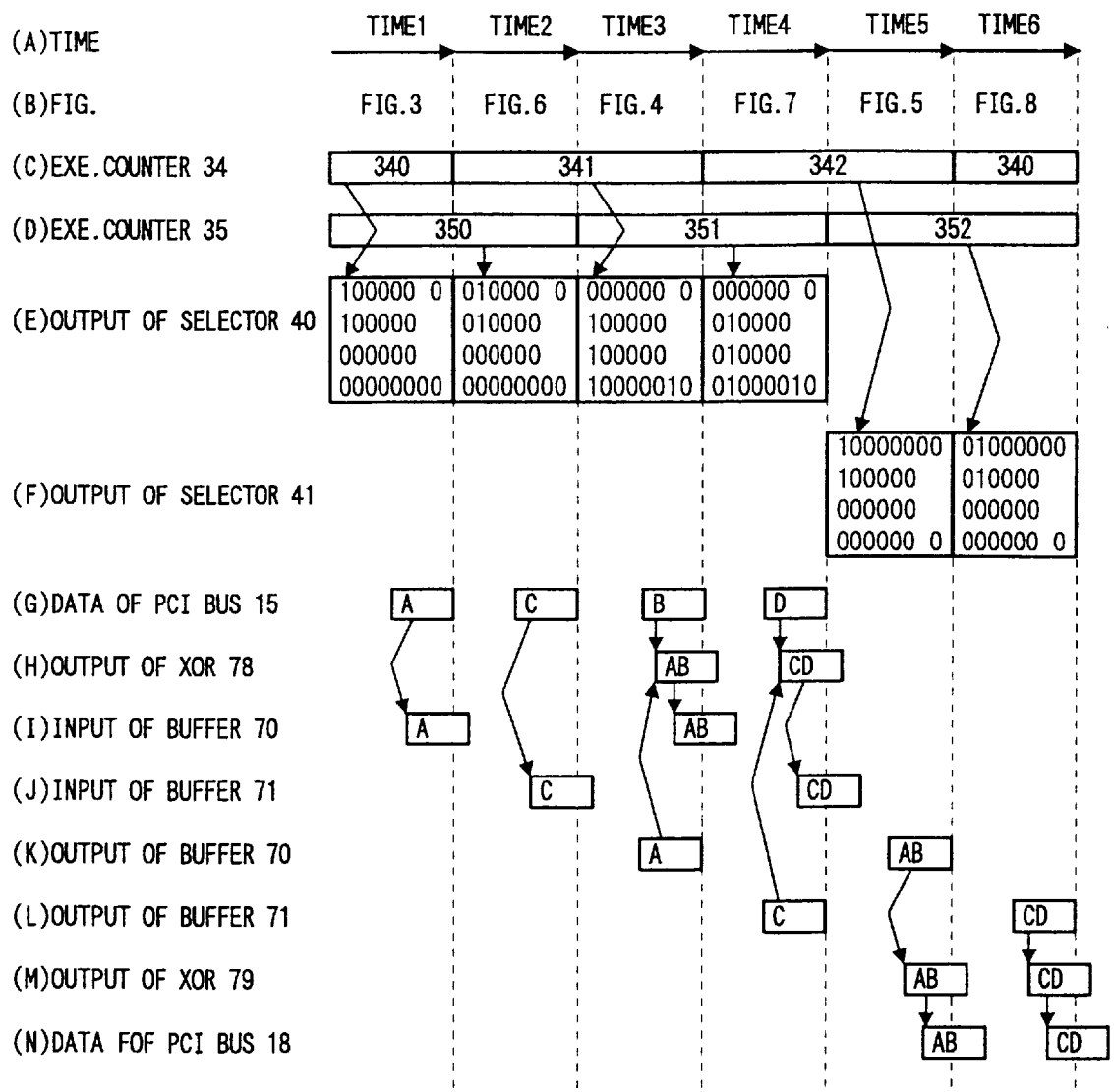

Secondly, with reference to a time chart of FIG. 16, at time 1, the setting 340 is executed to write data A, which is entered from the PCI bus 15 on the host device's side, on a data buffer 70 by way of a data flow indicated in FIG. 3.

Figure 6:
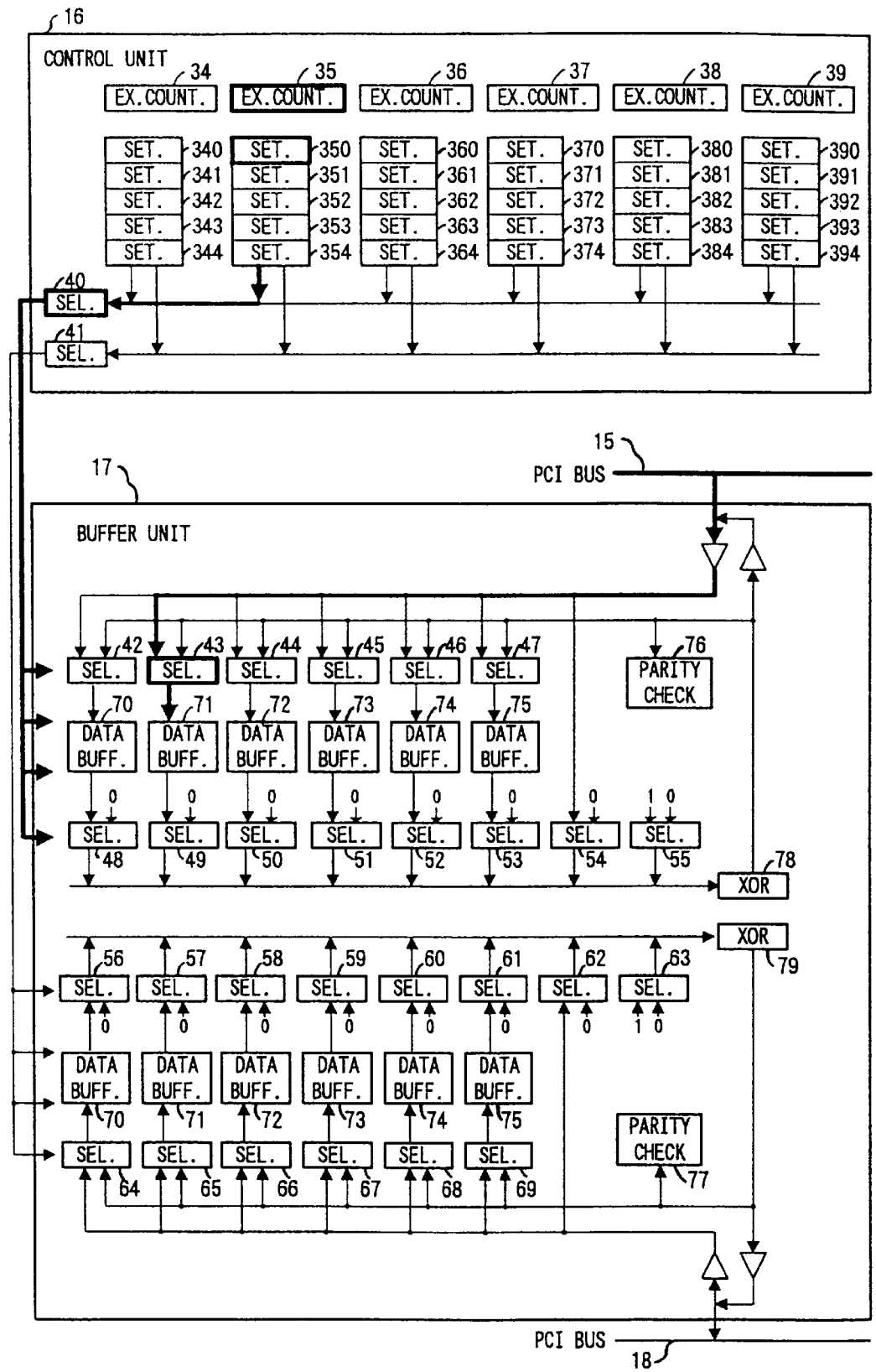

At time 2, the setting 350 is executed to write data C, which is entered from the PCI bus 15 on the host device's side, on a data buffer 71 by way of a data flow indicated in FIG. 6.

At time 3, the setting 341 is executed to write XOR obtained form the XOR circuit 78 using data B (which is entered from the PCI bus 15 on the host device's side) and data A (which is read out from the data buffer 70 concurrently with data B) on the data buffer 70 by way of a data flow indicated in FIG. 4. By the way, the XOR data of the data A and the data B is referred as data AB.

Figure 7:
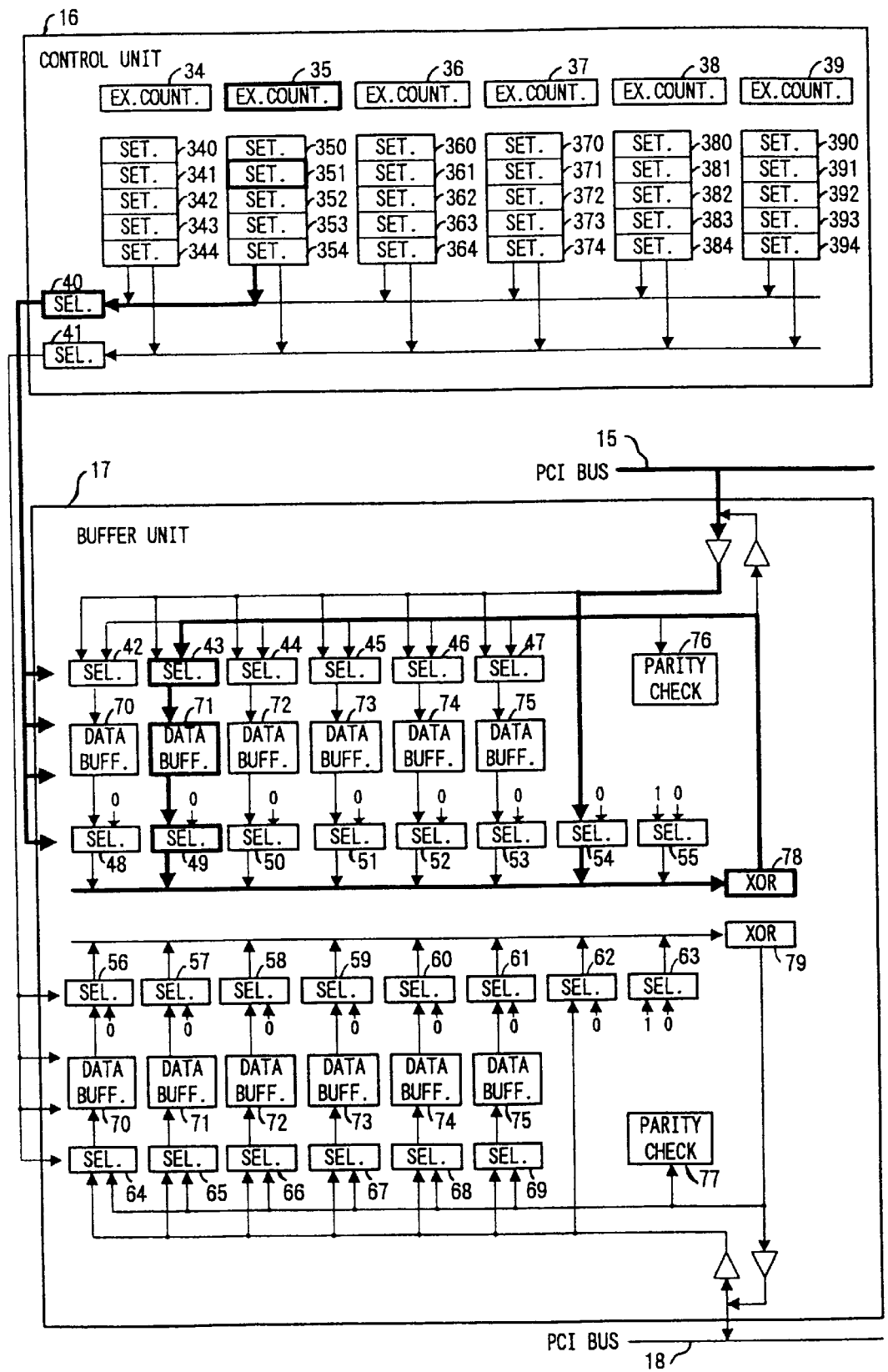
Figure 8:
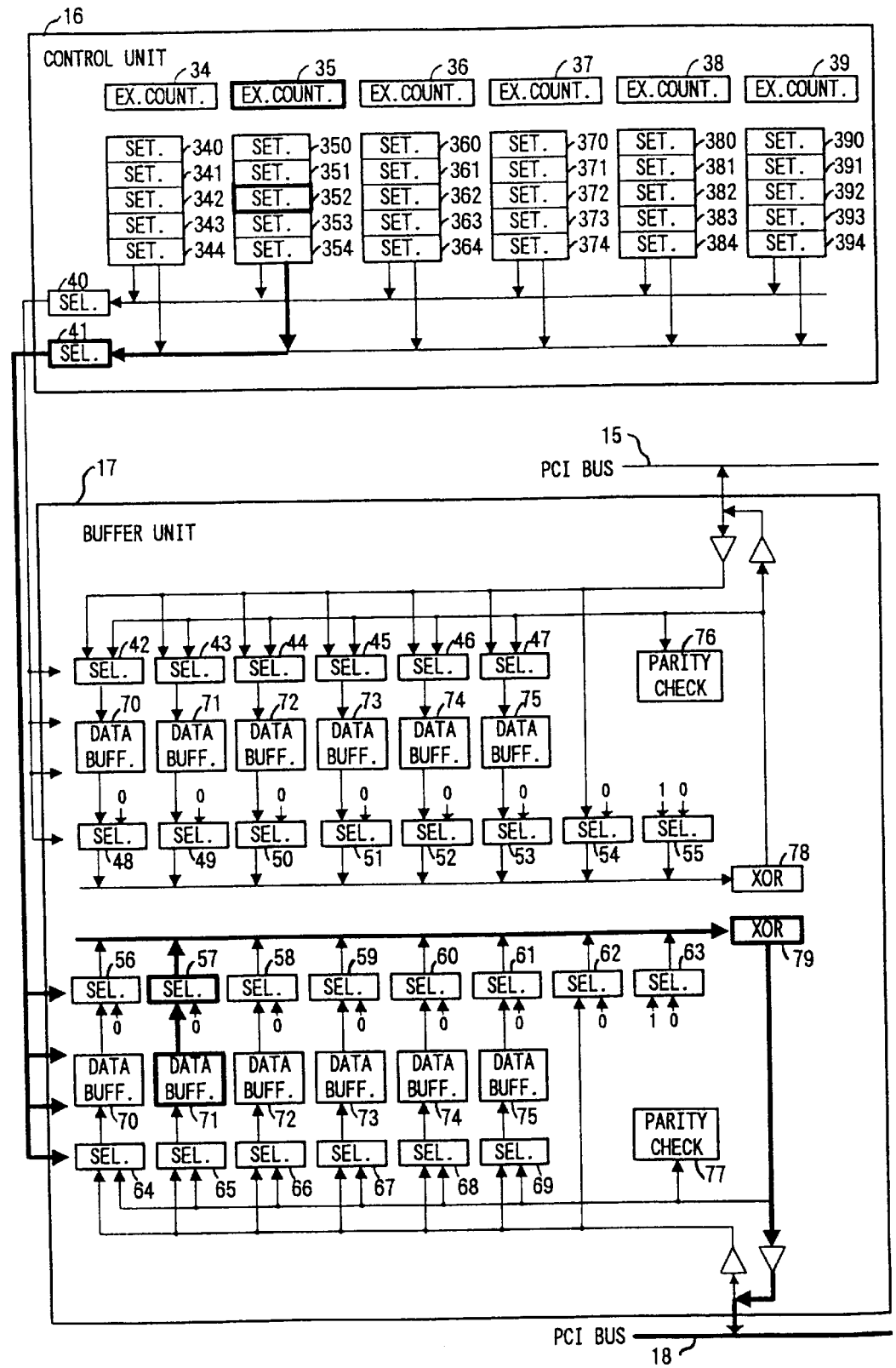

At time 4, the setting 351 is executed to write XOR obtained form the XOR circuit 78 using data D (which is entered from the PCI bus 15 on the host device's side) and data C (which is read out from the data buffer 71 concurrently with data D) on the data buffer 71 by way of a data flow indicated in FIG. 7. By the way, the XOR data of the data C and the data D is referred as data CD.

At time 5, the setting 342 is executed. Data AB read out from the data buffer 70 is outputted to the PCI bus 18 on the disk units' side and then written on a disk unit 29 through a SCSI chip 19, by way of a data flow indicated in FIG. 5.

At time 6, the setting 352 is executed. Data XD read out from the data buffer 71 is outputted to the PCI bus 18 on the disk units' side and then written on a disk unit 30 through a SCSI chip 20, by way of a data flow indicated in FIG. 8.

Figure 9:
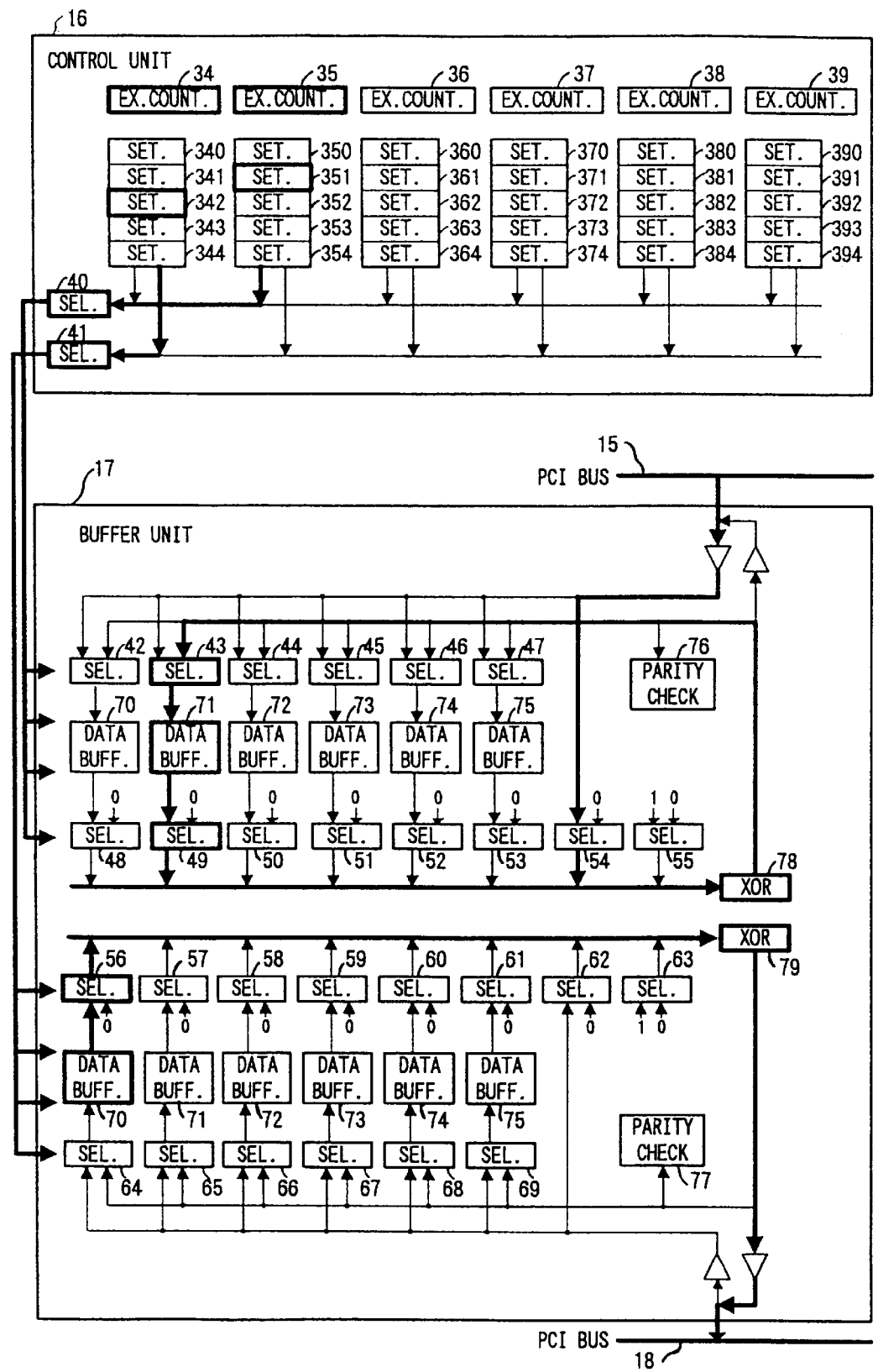

By repeating the data transmissions of times 1 to 6, the transmissions corresponding to the number of desired data are performed. Furthermore, different PCI buses are used at the time 4 (FIG. 7) and the time 5 (FIG. 5), respectively, so that it is possible to execute the data transmissions in parallel. Data flows of this case are illustrated in FIG. 9. That is, data D is read from the PCI bus 15 through the selector 54 and then the XOR circuit performs a logic operation on data C of the data buffer 71 and the data D to obtain XOR. Then, the obtained data CD is stored in the data buffer 71. At the same time, the data AB stored in the data buffer 70 is outputted to the PCI bus 18 through the XOR circuit 79. Then, the output is stored in the disk unit 29 through the SCSI chip 19.

In the next place, another operations of the embodiment of the present invention will be described, especially an operation using a parity check circuit is performed with the reference to FIGS. 10 to 14 and FIG. 17. In the data transmission of the present embodiment, as an example of operations which is frequently used for data transmissions in the third level RAID system, an operation will be described in which data read out from five disk units is stored in a main memory. The present data transmission uses two programs and five data buffers to store data A read out from a disk unit 29, data B read out from a disk unit 30, data C read out from a disk unit 31, and data D read out from a disk unit 32 in a main memory 14 in succession. Then, XOR is carried out on the data A to D and data E read out from a disk unit 33 to obtain XOR data and then a redundant parity check is performed on the XOR data.

Prior to activate the data transmission, a microprocessor 80 writes the following data on set resisters 340–344, 350–353 of a control unit 16 through the processor bus 81.

Set resister 340
The use of PCI bus 18 on disk units' side
Select signal of selectors 64, 69=1
Executing write operation of data buffers 70, 75
Set resister 341
The use of PCI bus 18 on disk units' side
Select signal of selectors 61, 62, 65, 69=1
Executing write operation of data buffers 71, 75
Executing read operation of data buffer 75
Set resister 342
The use of PCI bus 18 on disk units' side
Select signal of selectors 61, 62, 66, 69=1
Executing write operation of data buffer 72, 75
Executing read operation of data buffer 75
Set resister 343
The use of PCI bus 18 on disk units' side
Select signal of selectors 61, 62, 67, 69=1
Executing write operation of data buffer 73, 75
Executing read operation of data buffer 75
Set resister 344
The use of PCI bus 18 on disk units' side
Select signal of selectors 61, 62, 63=1
Executing read operation of data buffer 75
Executing parity check 77
Set resister 350

The use of PCI bus 15 on host device's side
Select signal of selector 48=1
Executing read operation of data buffer 70
Set resister 351
The use of PCI bus 15 on host device's side
Select signal of selectors 49=1
Executing read operation of data buffer 71
Set resister 352
The use of PCI bus 15 on host device's side
Select signal of selector 50=1
Executing read operation of data buffer 72
Set resister 353
The use of PCI bus 15 on host device's side
Select signal of selector 51=1
Executing read operation of data buffer 73

Figure 10:
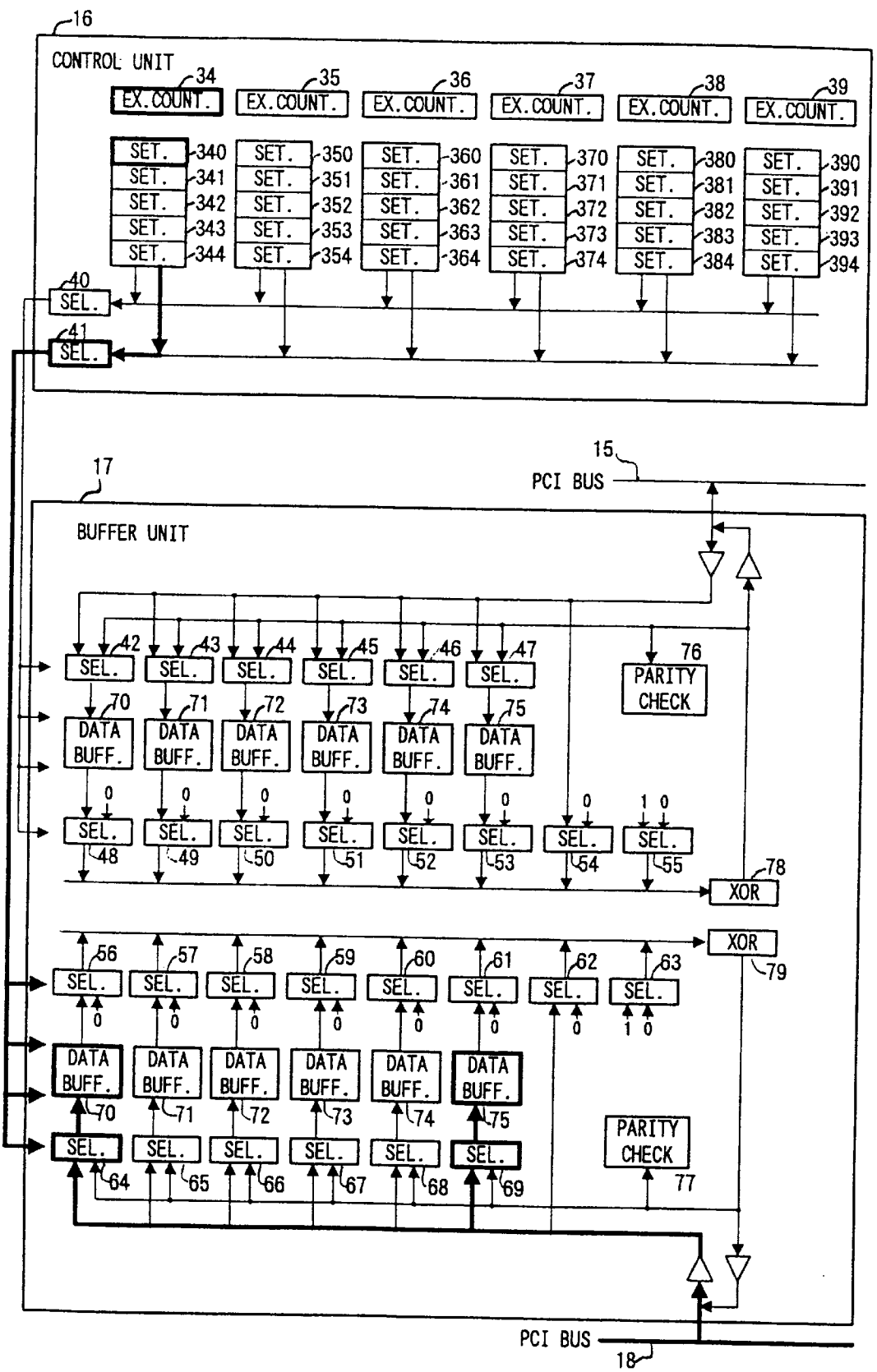
Figure 17:
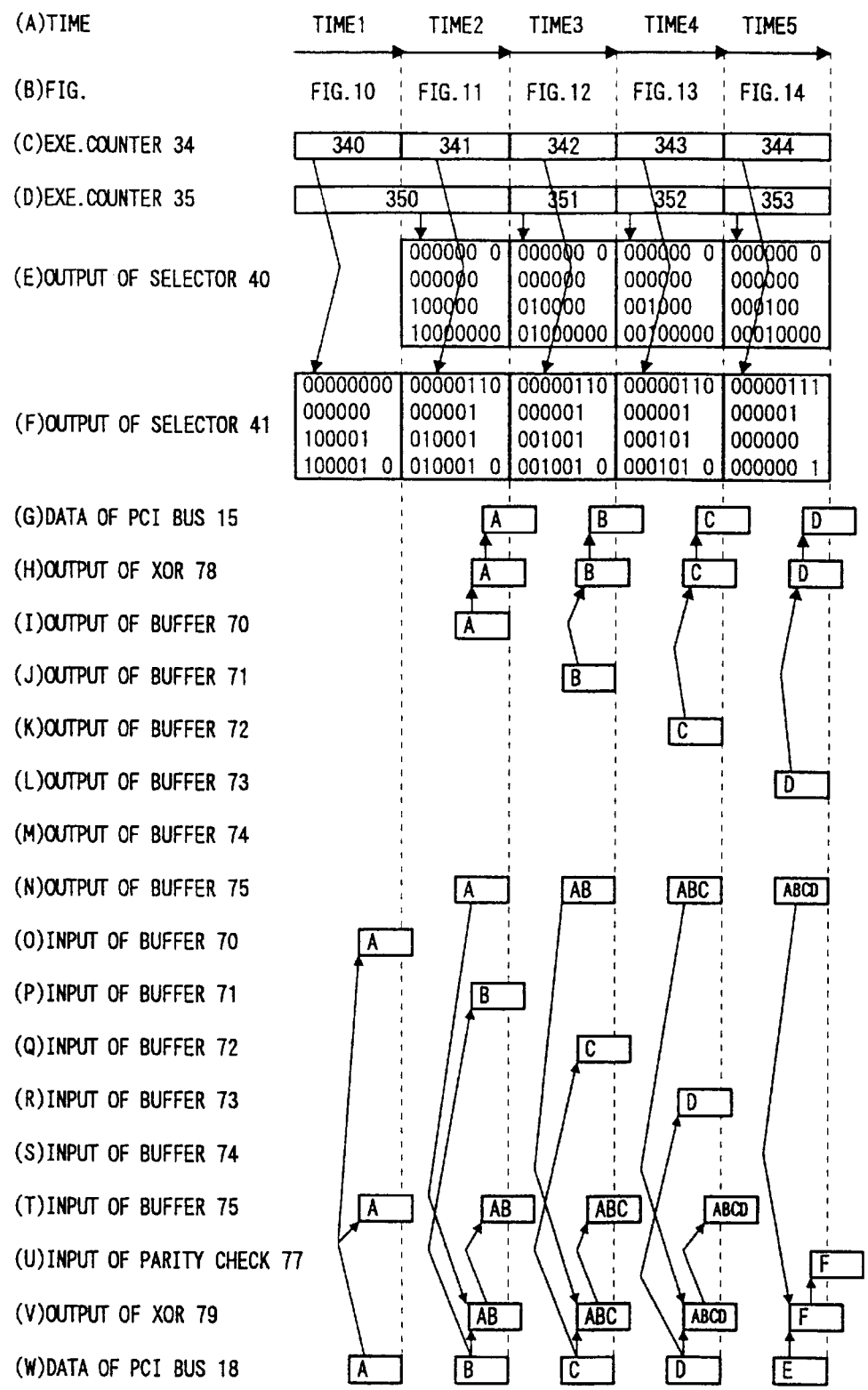

Secondly, with reference to a time chart of FIG. 17, at time 1, the setting 340 is executed to write data A, which is entered from the PCI bus 18 on the disk units' side, on data buffers 70, 75 from a disk unit 29 through a SCSI chip 19, by way of a data flow indicated in FIG. 10.

Figure 11:
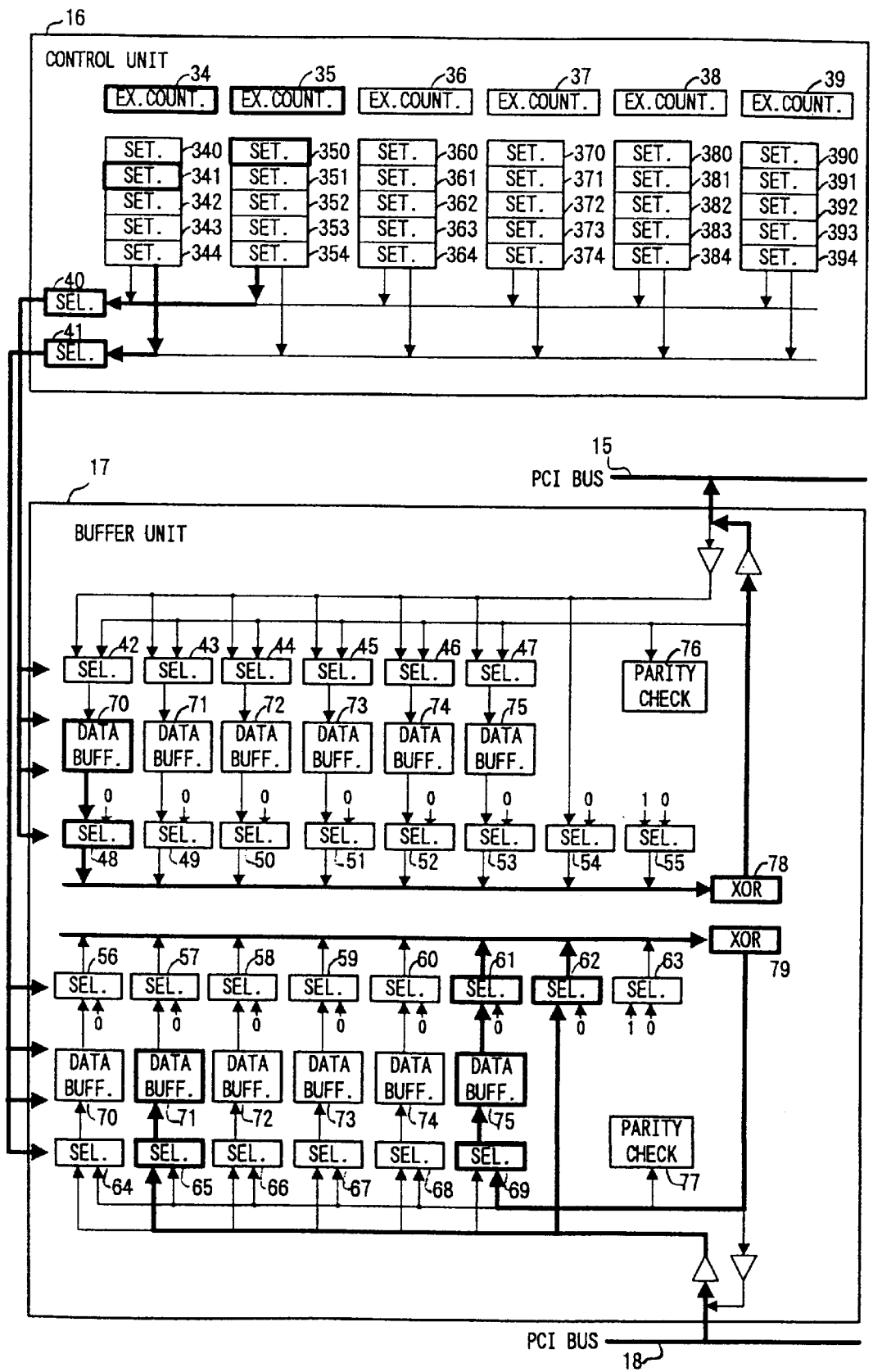

At time 2, the settings 341 and 350 are executed in parallel in accordance with values of executing counters 34 and 35 by way of a data flow illustrated in FIG. 11. Data B from the disk unit 30, which is entered from the PCI bus 18 on the disk units' side through a SCSI chip 20, is written on a data buffer 71. At the same time, the XOR circuit 79 performs a logic operation on the data B and data A read out from the data buffer 75 to obtain XOR. The resulting XOR data is written on the data buffer 75. By the way, the XOR data of the data A and the data B is referred as data AB. Furthermore, the data A read out from the data buffer 70 is outputted to the PCI bus 15 on the host device's side and then it is written on the main memory 14.

Figure 12:
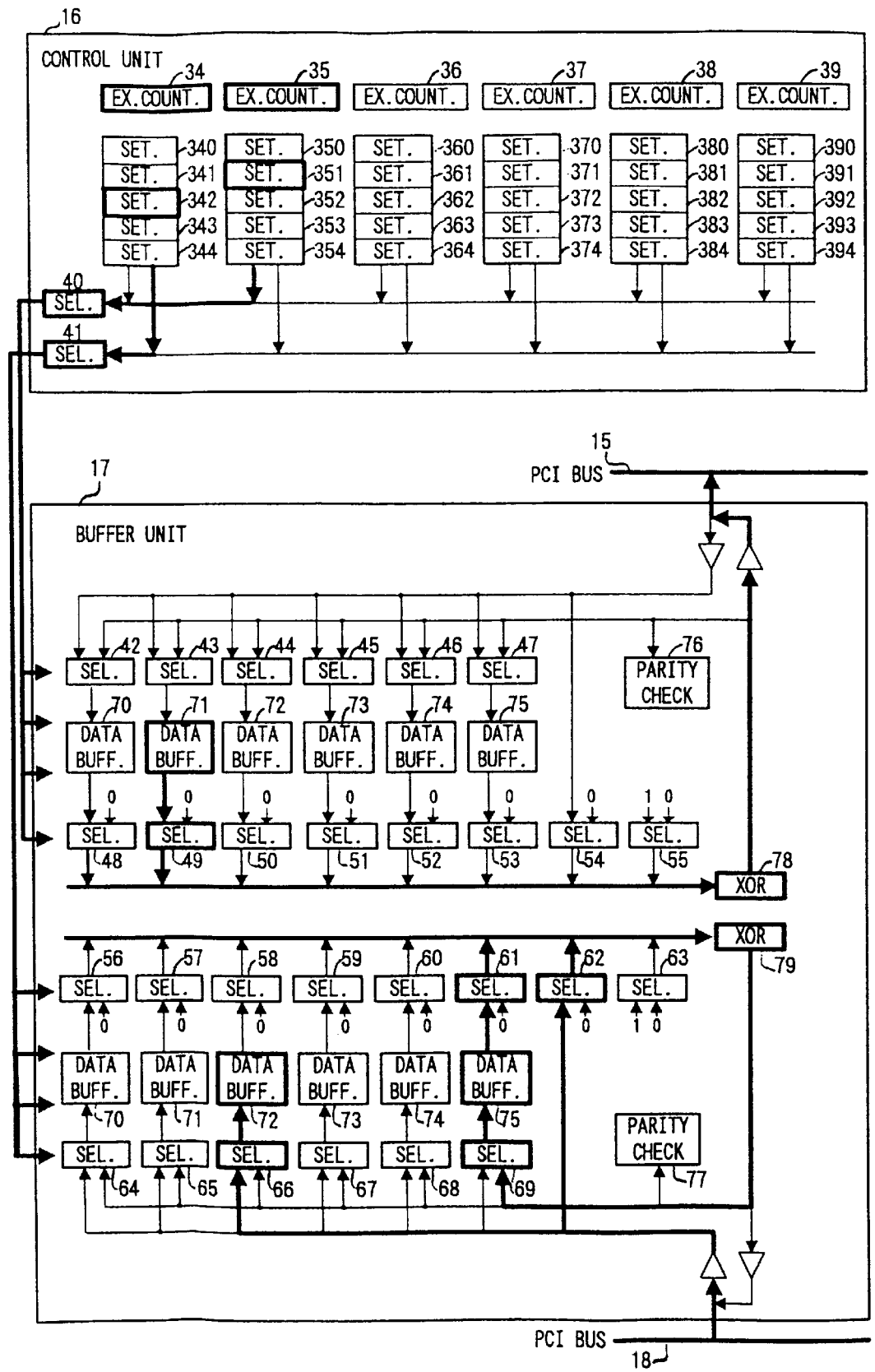

At time 3, the settings 342 and 351 are executed in parallel in accordance with values of executing counters 34 and 35 by way of a data flow illustrated in FIG. 12. Data C from the disk unit 31, which is entered from the PCI bus 18 on the disk units' side through a SCSI chip 21, is written on a data buffer 72. At the same time, the XOR circuit 79 performs a logic operation on the data C and data AB read out from the data buffer 75 to obtain XOR. The resulting XOR data is written on the data buffer 75. By the way, the XOR data of the data AB and the data C is referred as data ABC. Furthermore, the data B read out from the data buffer 71 is outputted to the PCI bus 15 on the host device's side and then it is written on the main memory 14.

Figure 13:
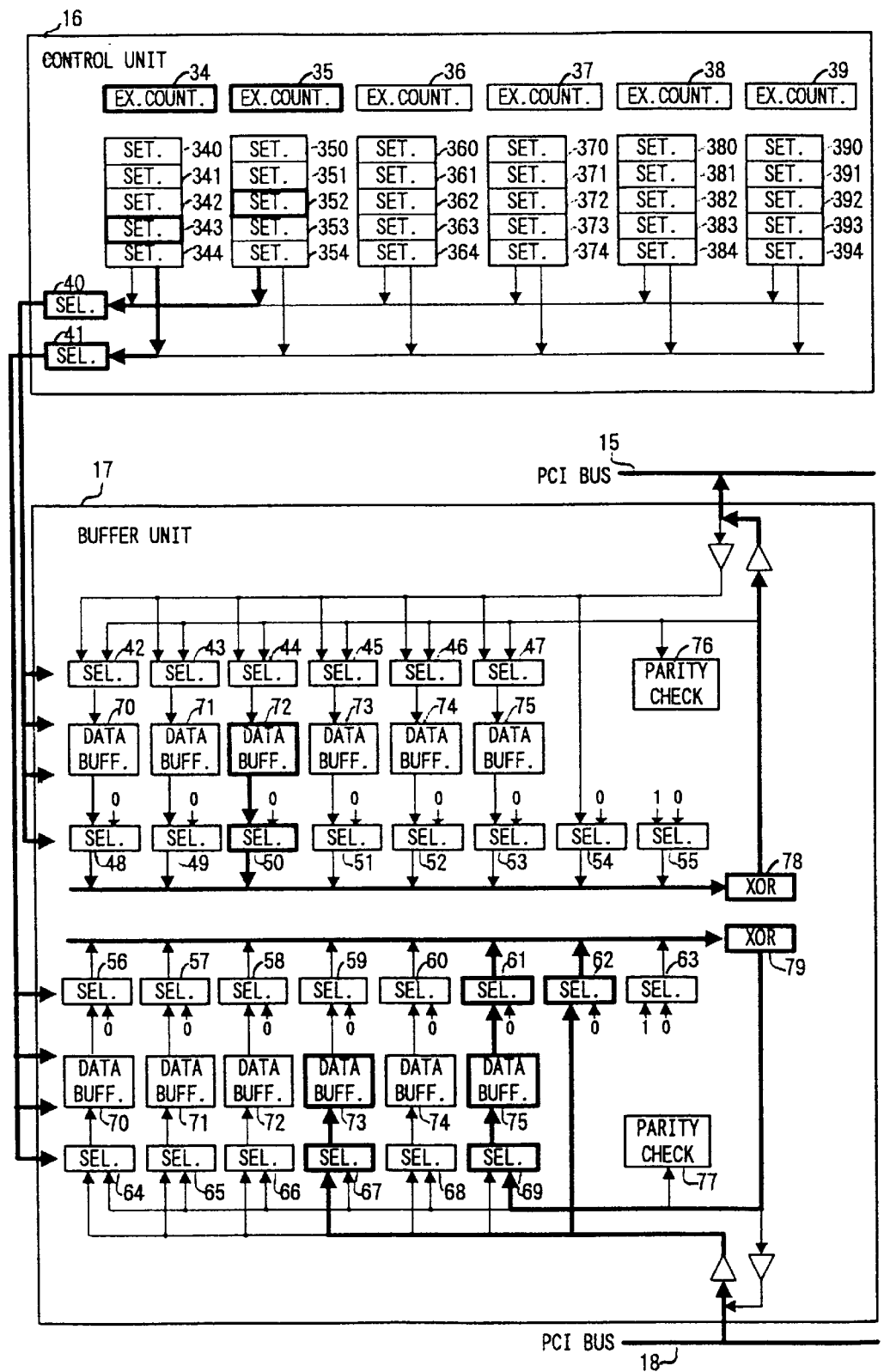

At time 4, the settings 343 and 352 are executed in parallel in accordance with values of executing counters 34 and 35 by way of a data flow illustrated in FIG. 13. Data D from the disk unit 32, which is entered from the PCI bus 18 on the disk units' side through a SCSI chip 22, is written on a data buffer 73. At the same time, the XOR circuit 79 performs a logic operation on the data D and data ABC read out from the data buffer 75 to obtain XOR. The resulting XOR data is written on the data buffer 75. By the way, the XOR data of the data ABC and the data D is referred as data ABCD. Furthermore, the data C read out from the data buffer 72 is outputted to the PCI bus 15 on the host device's side and then it is written on the main memory 14.

Figure 14:
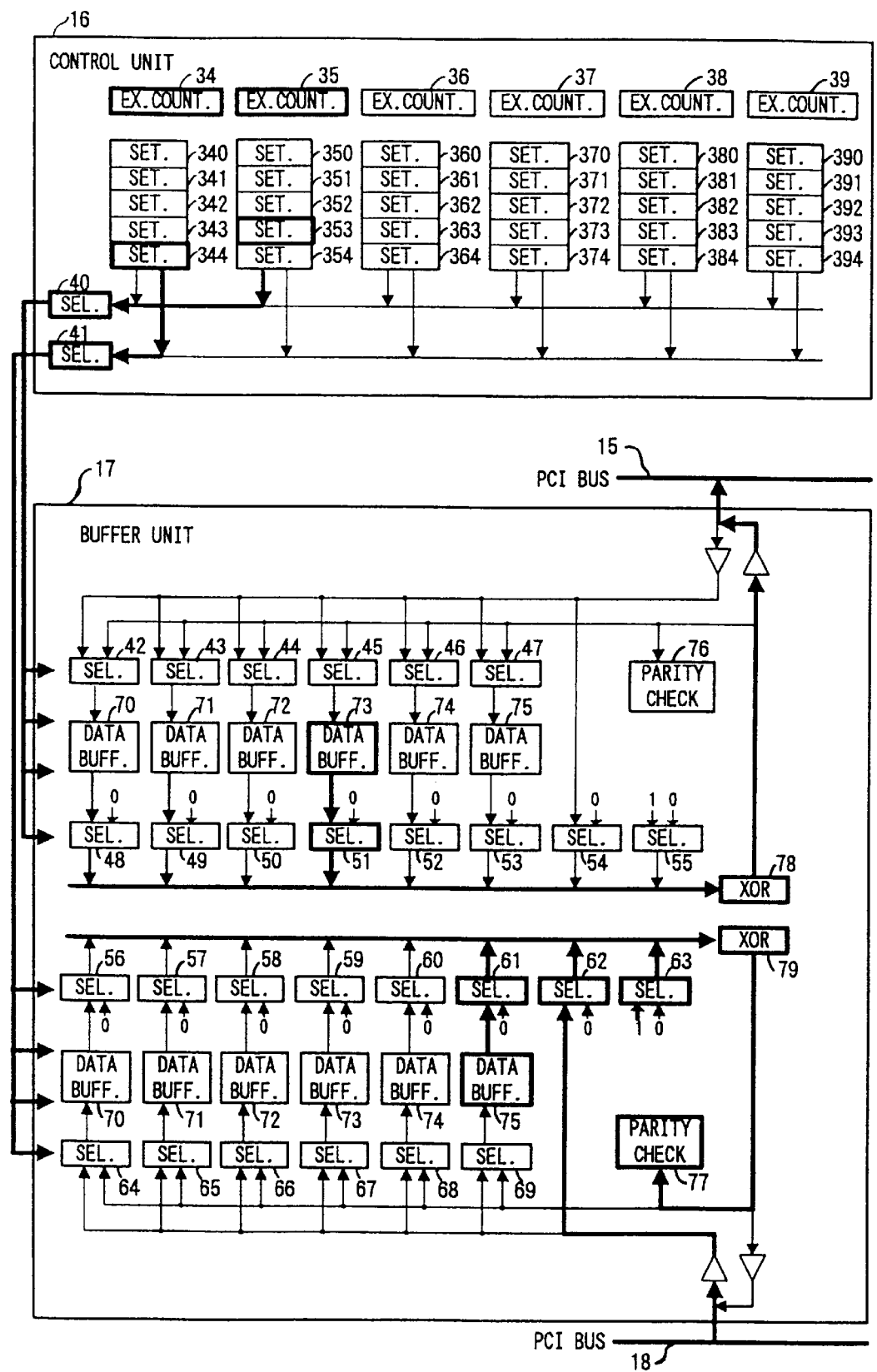

At time 5, the settings 344 and 353 are executed in parallel in accordance with values of executing counters 34 and 35 by way of a data flow illustrated in FIG. 14. The XOR circuit 79 performs a logic operation on data E from the disk unit 33, which is entered from the PCI bus 18 on the disk units' side through a SCSI chip 23; data ABCD read out from the data buffer 75; and reverse data from the selector 63 to obtain XOR. The resulting XOR data is transferred to a parity check circuit 77 to carry out a redundant parity check on the XOR data. By the way, the redundant parity employed in the present explanation is odd parity, so that there is no read to use reverse data in the case of using even parity. Furthermore, data D read out from the data buffer 73 is outputted to the PCI bus 15 on the host device's side and then, it is written on the main memory 14.

By repeating the data transmissions of times 1 to 5, the transmissions corresponding to the number of desired data are performed.

Figure 18:
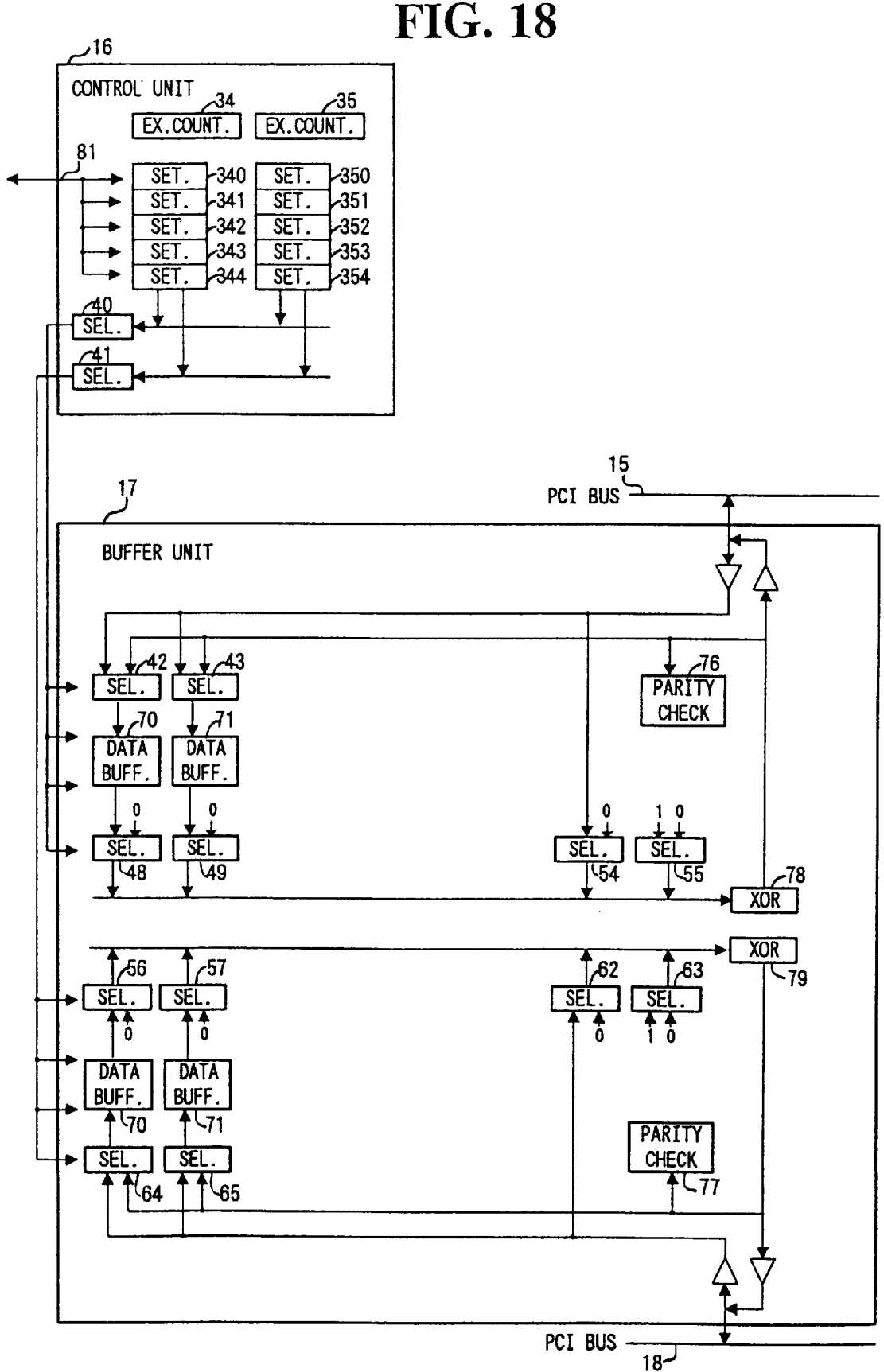
FIG. 18 is a block diagram of another embodiment according to the present invention.

Accordingly, as exemplified in FIG. 1, the above description may facilitate the understanding of a multi-purpose data bus architecture of the present invention which can be provided using a control unit 16 and a buffer unit 17 for a data flow between a host device 10 and array of disk units 29–33. Furthermore, other settings in addition to those described above can be applied in the present invention. As a matter of course, the present invention is not restricted to the specific embodiments described above. A person skilled in the art can be easily understood that various modifications and changes are possible without departing from the scope of the present invention. As shown in FIG. 18, for example, it is possible to constrict the disk-array controller of the present invention by using two data buffers, execution counters 34, 35, and set registers 340-, 350-. Optionally, a third PCI bus may be additionally used in the configuration so as to connect the third PCI bus and the common data buffer just as in the case of the first and second PCI buses. Furthermore, the present invention allows another type of host interface, disk interface, PCI bus, or the like in addition to those illustrated in the attached figures or described in the present explanation. For example, the interface is not limited to SCSI but it is also possible to use IPI (Intelligent Peripheral Interface), EISA (Extended Industry Standard Architecture), or fiber channel construction.

Now a second embodiment of the present invention will be described. The present embodiment has a configuration shown in FIG. 19. In the case of the RAID 5 system of the disk-array controller, data is devised into sectors and written to a plurality of disk units. Furthermore, their XOR data (hereinafter, referred as parity) are created and written to an additional disk unit, so that it is possible to carry out the reconstitution of data in the event of trouble on one disk unit. For realizing the RAID 5 system, the creation of parity and the reconstitution of data should be performed using a hardware of the disk-array controller that comprises XOR circuits and scrachpad memories.

In the following description, an array of five disk units is constructed so as to include four disk units on which data is provided and one disk units on which parity is provided.

In one of the conventional technologies, an exclusive OR (XOR) circuit as a parity generating circuit has been provided between a work memory and disk units. For carrying out the XOR operations on four data, the XOR circuit has four buffers. Each of the buffers receives data from the work memory. If four data are prepared, then they are XORed to create parity. The obtained parity is written on the disk units. In this process, however, there is a problem of generating the waiting for taking turns in the XOR circuit when a plurality of write operations are carried out in parallel.

To work around this problem, there is an idea of having two or more XOR circuits. In this case, however, the number of buffers per XOR circuit should be also increased on a proportional basis, resulting in a lager hardware. In the case of increasing the number of disk units included in a disk array, furthermore, the number of buffers per XOR circuit should be also increased on a proportional basis, resulting in a lager hardware.

In another conventional technology, an exclusive OR (XOR) circuit has been connected to an inner bus connecting to a work memory. In this case, the XOR circuit has two buffers for carrying out an exclusive OR operation on two data. Two data are transferred from the work memory to the respective buffers. If two data are in readiness for the XOR operation, then two data are XORed and the obtained XORed data is written on another area of the work memory. Similarly, the XORed data and third data are further XORed and the obtained XORed data is further XORed with fourth data to create parity. The obtained parity is written on the hard disk units. In this procedure, however, there is a problem of generating the waiting for taking turns in the XOR circuit when a plurality of write operations are carried out in parallel. In addition, the inner bus is being put to use with frequency, so that there is a problem of putting the inner under increasing load.

The disk-array controller of the present embodiment comprises a work memory for temporary storing data, buffers which is numerically equal to the sum of the number of disk interfaces plus 1, selectors for connecting between the work memory and the buffers, a control memory for retaining the states of read/write of the buffers and the selectors, and a control unit for controlling an execution position of the control memory.

Figure 19:
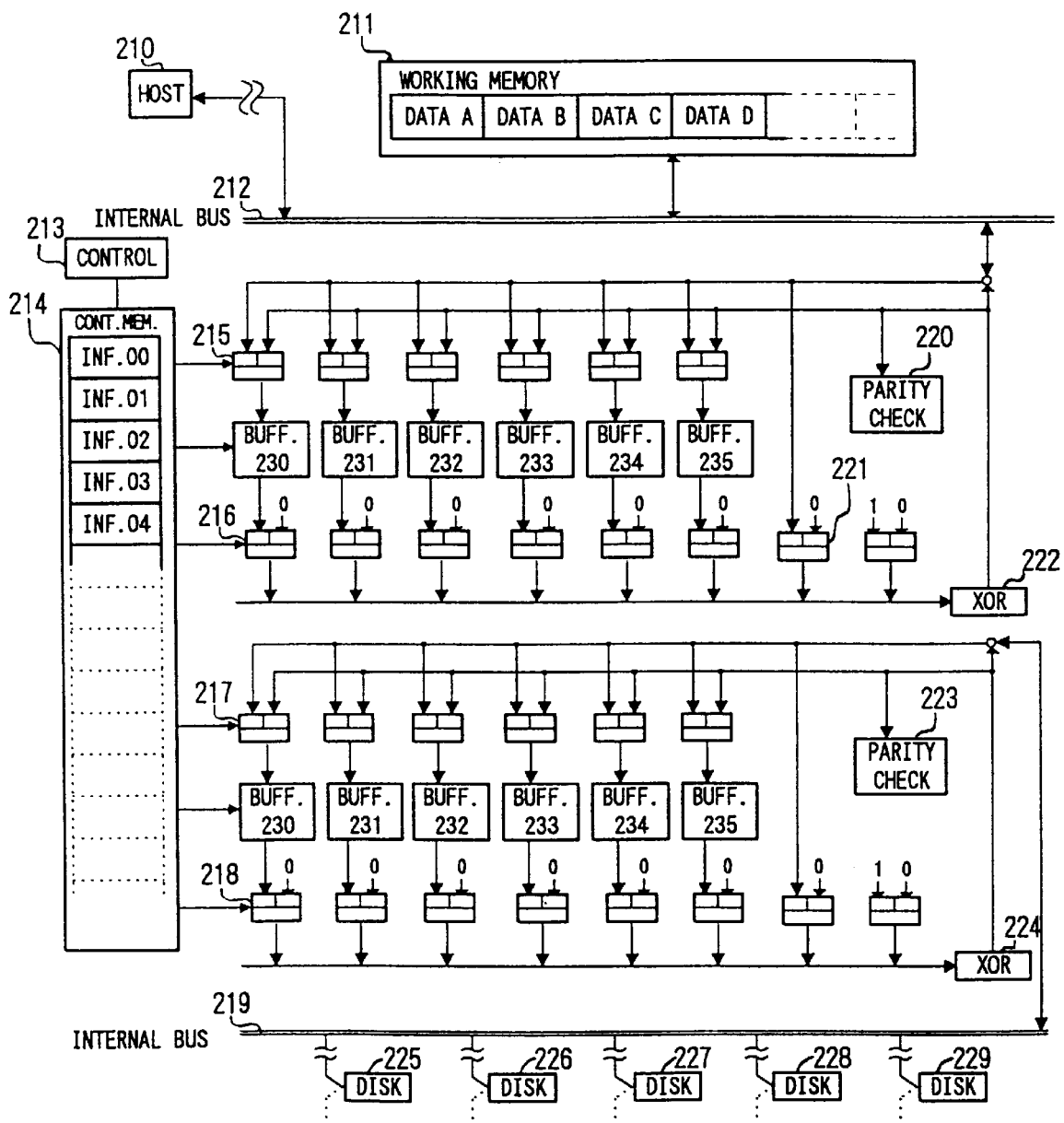
FIG. 19 is a block diagram of other embodiment according to the present invention.
Figure 20:
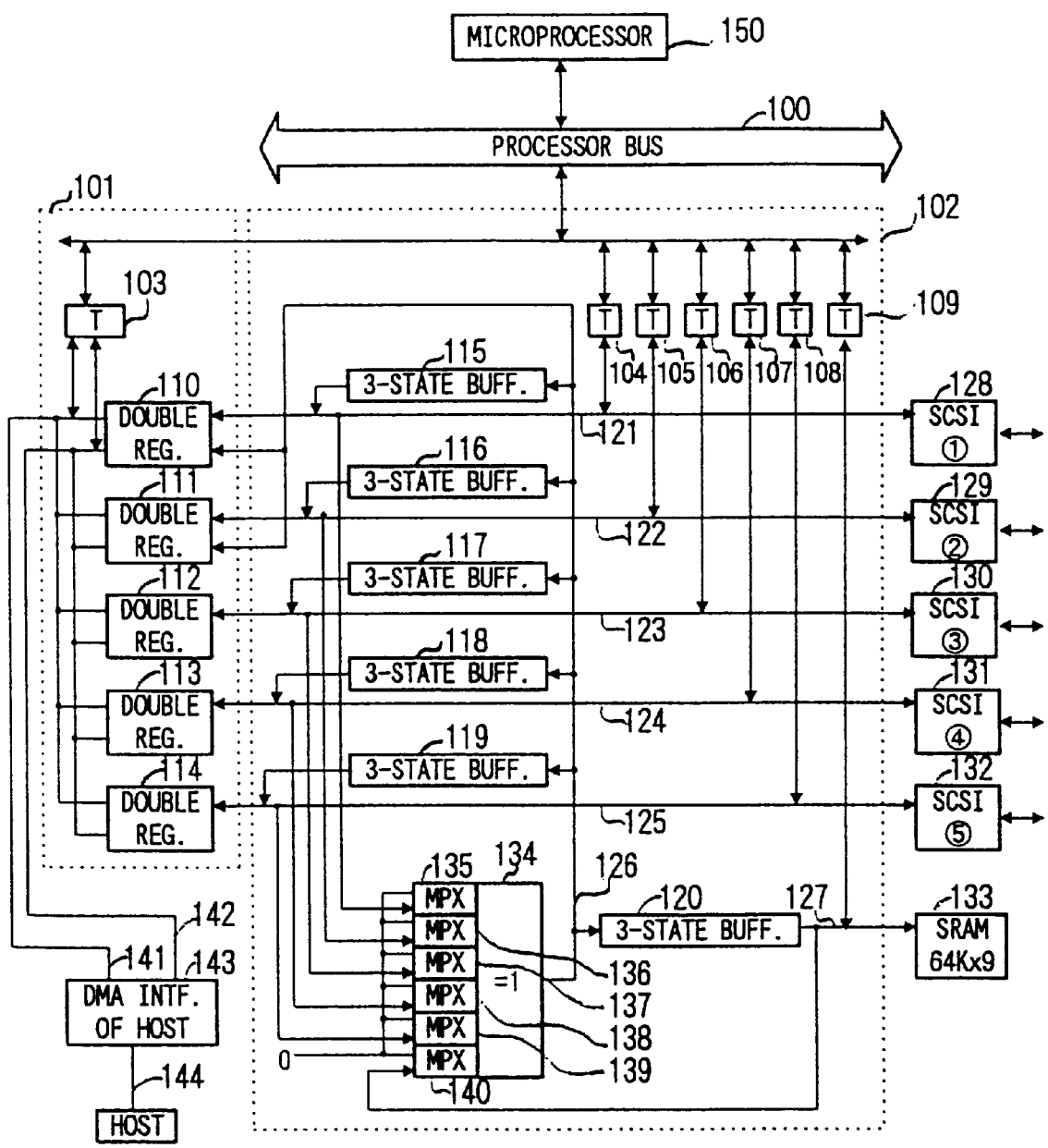
FIG. 20 is a diagram of the control unit in the prior art disk-array controller.

FIG. 19 is a block diagram showing a disk-array controller that comprises data inner buses 212, 219 between a host device 210 and disk units 225–229. Also, XOR circuits 222, 224, buffer circuits 230–235, and so on are arranged between the data inner buses 212, 219. In the figure, there are two identical sets of the buffers 230–235 where one set of the buffers is positioned on the upper area while another set of the buffers is positioned on the lower area. The data written by the upper buffers can be read out by the lower buffers. Furthermore, numeral references 215–218 denote selectors. In each selector, unless otherwise specified, the right-side is selected if it is in the OFF state while the left-side is selected if it is in the ON state.

Referring now to FIG. 19, the process including the steps of receiving data A to D from the host 210 and writing these data and parity on disk units 225–229 will be described.

Data received from the host 210 is written on the work memory 211 through the inner bus 212.

Then, we will explain the process for writing data A from the work memory on a disk unit 225. Information "00" of the control memory 214 stores a statement of ON of the selector 215 and a statement of write of the buffer 230. Information "01", stores a statement of ON of the selector 218 and Read of the buffer 230. At first, the control unit 213 selects the information "00" to write the data A of the work memory on the buffer 230 through the inner bus 212 and the selector 215. Next, the controller unit 213 selects the information "01" of the control memory 214 to write the data on the disk 225 through the selector 218 and the XOR 224.

Similarly, data B to D of the work memory 211 may be written in the disk units 226–228.

Besides, we will also explain the process of writing parity, which is prepared from the data A to D of the work memory 211, on the disk unit 229. The information "00" of the control memory stores ON of the selector 215 and Write of the buffer 230. Prior to the process, the information "01" to "03" stores ON of the selectors 216, 221 and Read and Write of the buffer 230, and the information "04" stores ON of the selector 218 and Read of the buffer 230 in advance. Initially, the control unit 213 selects the information "00" of the control memory 214 to write the data A of the work memory 211 on the buffer 230 through the inner bus 212 and the selector 215. Then, the control unit 213 selects the information "01" of the control memory 214 to transfer the data B of the work memory 211 to the XOR circuit 222 through the inner bus 212 and the selector 221, concurrently with transferring the data A of the buffer 230 to the XOR circuit 222 through the selector 216, in which the data A and the data B are XORed and then the resulting data is written on the buffer 230. Likewise, the information "02" to "03" of the control memory 214 is selected. Then, the data C to D of the work memory 211 are XORed and the resulting data is written on the buffer 230 to make parity from the data of the buffer 230.

Next in order, the control unit 213 selects the information "04" of the control memory 214 to write the parity of buffer 230 on the disk unit 229 through the selector 218, the XOR circuit 224, and the inner bus 219.

In the above description, the data and the parity cannot be processed more than a capacity of the buffer 230 at a time, so that the controller 213 repeats the process to permit the transmission of data more than the capacity of the buffer 230.

Furthermore, the reason that the number of the buffers is the sum of the number of the disk interfaces plus one is for using as a work buffer for making parity at the time of simultaneously writing on five disk units or the like. Parity check circuits 220, 223 are provided for confirming data correctness when the data is read out from the disk.

As described above, the present invention has the effect of without waiting for taking turns in the XOR circuit because the parity generations are performed in parallel as much as the number of the buffers. In the case of increasing the number of disk units included in a disk array, furthermore, it can be attained by increasing the amount of the information of the control memory 214. Thus, there is no need to make the hardware larger.

The described embodiments are of having one host device, but is not limited to use only one host device. Two or more host devices may connect to the PCI bus or the inner bus. In this case, it can be operated in a similar fashion with similar effect if each of the host devices clearly demonstrates its address index. The present invention can be applied on a larger computer system by operating the above disk array device as a common memory.

According to the present invention, a data-transfer structure for interconnecting between a host device and an array of disk units can be provided because of having data buffers accessible from any of the host device and the disk units.

Also, a disk-array controller of the present invention comprises various selectors, XOR circuits, parity check circuits, and so on. Thus, transfer passes can be switched by changing their settings. In addition, the settings can be programmed using set registers and execution counters, so that they can be compatible with different RAID configurations by setting various transmission procedures. In the disk array device of the present invention, furthermore, through the use of the characteristics of PCI bus, the program using the set registers and the execution resisters adjusts the settings of various selectors, XOR circuit, and parity check circuits for its self when the program gets access to the PCI bus. At the time of releasing the access to the PCI bus, the above settings are also released. Therefore, it appears that any program occupies PCI buses, various selectors, XOR circuits, and parity check circuits at the instant. However, if it is viewed as a whole, it looks as though the parallel processing is proceeded without waiting for taking turns in the XOR circuit. Therefore, the disk-array controller permits a plurality of data transmissions in parallel and high-speed data transmissions without causing any wait for taking turns in the XOR circuit.

In the disk-array controller of the present invention has the effect of carrying out the calculation of XOR for the number of data exceeding the number of inputs of the XOR circuit by a single execution because of the facts that an output of each data buffer can be entered into any data buffer in conjunction with data of PCI bus by way of the XOR circuit and this process can be repeated over and over again by increasing the number of set registers.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A disk-array controller, comprising:

data buffers accessible from any of a host device and disk units;

exclusive-OR circuits for carrying out exclusive-OR operations;

circuits for checking redundant parity, where outputs of the exclusive-OR circuits are determined as true when the outputs are all zero "0";

selectors for selecting outputs from the host devices or the disk units and outputs from the exclusive-OR circuits and transferring selected outputs to the data buffers;

selectors for selecting whether or not to transport outputs from each of the data buffers to the exclusive-OR circuits;

selectors for selecting whether or not to transport outputs from the host device or the disk units;

selectors for selecting whether or not to transport all one "1" to the exclusive-OR circuits to reverse outputs of the exclusive-OR circuit; and transfer buses for transferring outputs of the exclusive-OR circuits to the host device and the disk units, wherein the transfer buses are determined by adjusting a selection of the selectors at the time of transmission.

2. The disk-array controller as claimed in claim 1, further comprising:

a plurality of set registers for retaining read/write execution signals of each of the data buffers, select signals of each of the selectors, and a setting whether or not to check the redundant parity every time transmission occurs; and execution counters for retaining an execution position of such a setting, wherein settings of the transfer buses are preliminary programmed, local buses that perform time sharing processing are used as PCI buses, and the transfer buses are adjusted in accordance with the program during a period of acquiring access of the local busses.

3. A disk-array controller having a host device and a plurality of disk units, comprising:

a first bus connecting to the host device;

a second bus connecting to a plurality of the disk units;

a plurality of data buffers connecting between the first bus and the second bus through input selectors and output selectors;

a first exclusive-OR circuit in which output of the output selector, output of the first bus, and output of a selector which outputs odd or even are provided as inputs;

a second exclusive-OR circuit in which output of the output selector, output of the second bus, and output of a selector which outputs odd or even are provided as inputs; and a control unit for controlling the selections of the input selectors and the output selectors, wherein outputs of the first exclusive-OR circuit and the second exclusive-OR circuit are stored in any of a plurality of the data buffers.

4. The disk-array controller as claimed in claim 3, wherein the control unit controls the selections of the input selectors and the output selectors with reference to a RAID level.

5. The disk-array controller as claimed in claim 3, wherein the first bus and the second bus are PCI buses, and a SCSI interface chip is provided between the host device and the first bus, and also SCSI interface chips are provided between a plurality of the disk units and the second bus.

6. The disk-array controller as claimed in claim 3, wherein the input selectors connecting to the first bus and output of the first exclusive-OR circuit produce outputs of data to any of the data buffers under the control of the control unit, outputs of the data buffers enter into the first exclusive-OR circuit through the output selectors under the control of the control unit.

7. The disk-array controller as claimed in claim 3, wherein the input selectors connecting to the second bus and output of the second exclusive-OR circuit produce outputs of data to any of the data buffers under the control of the control unit, outputs of the data buffers enter into the second exclusive-OR circuit through the output selectors under the control of the control unit.

8. The disk-array controller as claimed in claim 3, wherein the input selectors connecting to the first bus and output of the first exclusive-OR circuit produce outputs of data to any of the data buffers under the control of the control unit, outputs of the data buffers enter into the second exclusive-OR circuit through the output selectors under the control of the control unit to supply it to the second bus for storing it into one of the plurality of disk units.

9. The disk-array controller as claimed in claim 3, wherein the input selectors connecting to the second bus and output of the second exclusive-OR circuit produce outputs of data to any of the data buffers under the control of the control unit, outputs of the data buffers enter into the first exclusive-OR circuit through the output selectors under the control of the control unit to input it to the host devices.

\* \* \* \* \*